US009727282B2

(12) United States Patent
Mizuno

(10) Patent No.: US 9,727,282 B2
(45) Date of Patent: Aug. 8, 2017

(54) JOB PROCESSING APPARATUS TO DISPLAY SCREENS BASED ON INTERRUPT AND LOGGED IN USER

(71) Applicant: CANON KABUSHIKI KAISHA, Tokyo (JP)

(72) Inventor: Takafumi Mizuno, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/178,311

(22) Filed: Jun. 9, 2016

(65) Prior Publication Data
US 2016/0371039 A1 Dec. 22, 2016

(30) Foreign Application Priority Data
Jun. 19, 2015 (JP) ................. 2015-124268

(51) Int. Cl.
G06F 15/00 (2006.01)
G06F 3/12 (2006.01)
G06K 1/00 (2006.01)
H04N 1/00 (2006.01)

(52) U.S. Cl.
CPC ............ *G06F 3/1215* (2013.01); *G06F 3/121* (2013.01); *G06F 3/1234* (2013.01); *G06F 3/1259* (2013.01); *H04N 1/00411* (2013.01); *H04N 2201/0094* (2013.01)

(58) Field of Classification Search
CPC ...... G06F 3/1215; G06F 3/121; G06F 3/1234; G06F 3/1259; H04N 1/00411; H04N 2201/0094
USPC ............... 358/1.15, 1.1, 1.13, 1.14
See application file for complete search history.

(56) References Cited

U.S. PATENT DOCUMENTS

2014/0294406 A1* 10/2014 Eguchi ................ G03G 15/706
399/22
2015/0189119 A1* 7/2015 Mizuno ................ H04N 1/2158
358/1.16

FOREIGN PATENT DOCUMENTS

JP 11-314439 A 11/1999
JP 2012-118227 A 6/2012

* cited by examiner

*Primary Examiner* — Douglas Tran
(74) *Attorney, Agent, or Firm* — Canon U.S.A., Inc. IP Division

(57) ABSTRACT

A job processing apparatus includes an execution unit that carries out a job and a display unit. The display unit displays, when a first interrupt factor is generated in the job being carried out, a first screen regarding an operation for resuming the job which the first interrupt factor has impacted, and displays, when a second interrupt factor is generated, a second screen regarding an operation for resuming the job which the second interrupt factor has impacted. Based on the first interrupt factor, the display unit displays the first screen while the previous user is logging in to the job processing apparatus and while a different user from the previous user is logging in. Based on the second interrupt factor, the display unit displays the second screen while the previous user is logging in and does not display the second screen while the different user is logging in.

14 Claims, 19 Drawing Sheets

FIG.5

SCAN AND TRANSMIT

LIST OF DESTINATION(S)
aaa@xxx.yyyy

- SELECT COLOR MODE
- SPECIFY RESOLUTION
- SIZE OF ORIGINAL DOCUMENT
- FILE FORMAT
- TYPE OF ORIGINAL DOCUMENT
- DOUBLE-SIDED ORIGINAL DOCUMENT
- MIXED ORIGINAL DOCUMENTS

FILENAME

NEW DESTINATION

ADDRESS BOOK

~500

YOU ARE IN THE SYSTEM MANAGEMENT MODE.   (LOGOUT)

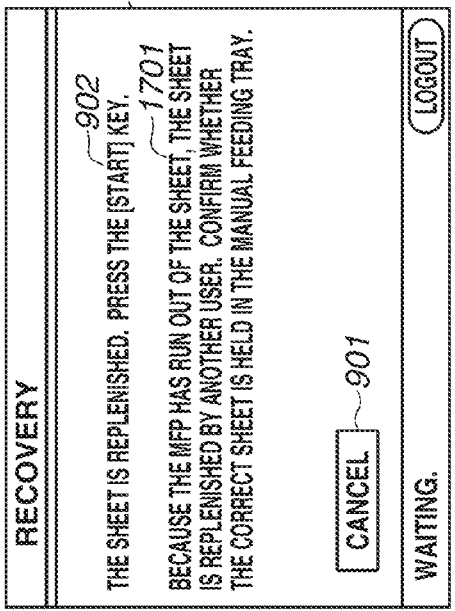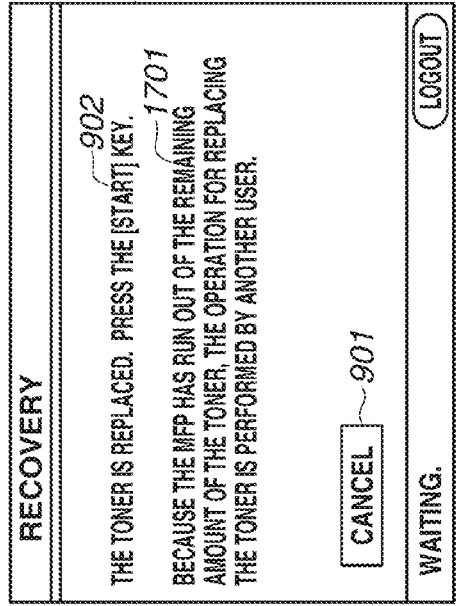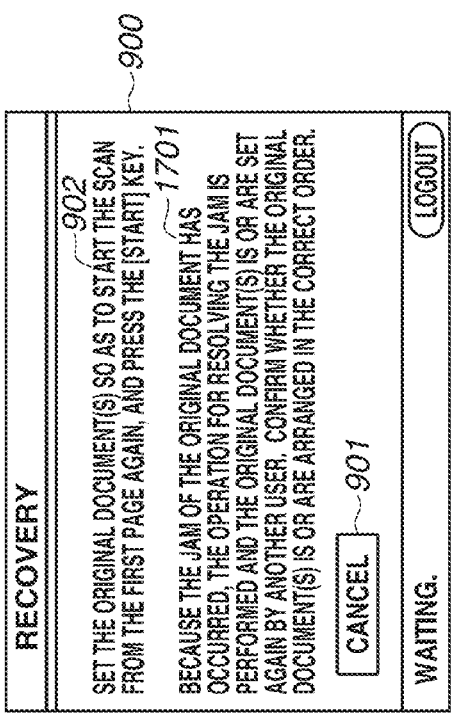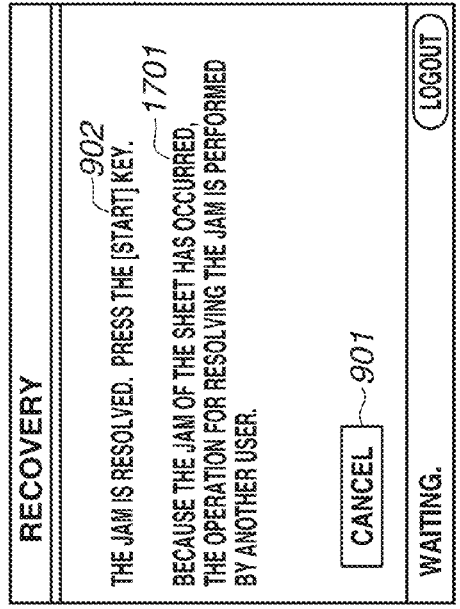

JOB PROCESSING APPARATUS TO DISPLAY SCREENS BASED ON INTERRUPT AND LOGGED IN USER

BACKGROUND OF THE INVENTION

Field of the Invention

The present invention relates to a job processing apparatus, a method for controlling a job processing apparatus, a program, and a storage medium.

Description of the Related Art

There is a printing apparatus that, when an error has occurred in a job, notifies the occurrence of the error and a content thereof to a user registered as a notification destination of the error (for example, an owner of this job), by an electronic mail (refer to Japanese Patent Application Laid-Open No. 11-314439).

There is an image forming apparatus that, when a user logs out, continuously carries out an uncompleted job (refer to Japanese Patent Application Laid-Open No. 2012-118227).

After a logout of a user who has logged in to a job processing apparatus (hereinafter referred to as a previous user), an interrupt factor, such as a jam of an original document and a jam of a sheet to be used in printing, may be generated while a job instructed by this previous user is running. In this case, a screen prompting the user to perform an operation for resuming the job which the interrupt factor has impacted is displayed when the interrupt factor that has impacted the job of the previous user is resolved. At this time, the screen prompting the user to perform the operation for resuming the job instructed by this previous user which the interrupt factor has impacted is displayed, even if the job processing apparatus is in such a state that a different user from the previous user is logging in to the job processing apparatus.

If the interrupt factor that has impacted the job instructed by the previous user is, for example, the jam of a sheet to be used in the printing, a screen prompting the user to perform an operation for resuming the job in which the jam has occurred is displayed while the different user from this previous user has logged in to the job processing apparatus. Then, after removing the jammed sheet for use in the printing from the apparatus, the different user from this previous user performs the operation for resuming the job in which the jam of the sheet for use in the printing has occurred. This operation allows the job processing apparatus to resume the interrupted printing of the job instructed by the previous user, thereby speeding up completion of execution of the job instructed by this previous user.

On the other hand, if the interrupt factor that has impacted the job instructed by the previous user is, for example, the jam of the original document, a screen prompting the user to perform an operation for resuming the job in which the jam of the original document has occurred is displayed while the different user from this previous user has logged in to the job processing apparatus. Then, after removing the jammed original document from the apparatus and setting the original document on a document tray again, the different user from this previous user performs the operation for resuming the job in which the jam of the original document has occurred. In this case, the different user from the previous user may inadvertently set the original document on the document tray in an incorrect order unless he/she knows a correct order in which the original document should be set on the document tray. If the operation for resuming the job is performed with the original document set on the document tray in the incorrect order and the job processing apparatus resumes the interrupted reading of the original document of the job instructed by the previous user, the job instructed by the previous user may be executed with a result unintended by the previous user. On the other hand, the previous user knows the correct order in which the original document should be set on the document tray. Therefore, if the previous user resumes the job in which the jam of the original document has occurred after removing the jammed original document from the apparatus and setting the original document on the document tray again, as a consequence of the resumption, the job instructed by the previous user can have a result intended by the previous user.

Therefore it is necessary to determine whether to entrust the different user from the previous user with resolving the interrupt factor that has impacted the job which is not instructed by this different user himself/herself and performing the operation for resuming the job which the interrupt factor has impacted, in consideration of a type of the interrupt factor that has impacted the job instructed by the previous user.

As another issue, a plurality of same original documents is rarely prepared for the purpose of reading, whereby it is better to leave the task of removing the jammed original document from the apparatus to an owner of the original document (the previous user) to prevent this original document from being damaged. On the other hand, a plurality of identical sheets for use in the printing (especially, a sheet without any image recorded thereon) is mostly prepared, whereby it causes no problem to leave the task of removing the jammed sheet from the apparatus to the different user from the previous user without worrying about a risk of damage on this sheet.

Therefore, it is necessary to determine whether to entrust the different user from the previous user with the operation for resolving the interrupt factor that has impacted the job not instructed by this different user himself/herself to resume the interrupted job, in consideration of the type of the interrupt factor that has impacted the job instructed by the previous user.

SUMMARY OF THE INVENTION

The present invention is directed to providing an apparatus, a method, and the like that, based on an interrupt factor that has impacted a job instructed by a previous log-in user, and determine whether to display the screen for resuming the job which the interrupt factor has impacted while the different user from the previous user is logging in.

According to an aspect of the present invention, a job processing apparatus includes an execution unit configured to carry out a job, and a display unit configured to display, when a first interrupt factor is generated in the job being carried out by the execution unit, a first screen regarding an operation for resuming the job which the first interrupt factor has impacted, and configured to display, when a second interrupt factor is generated in the job being carried out by the execution unit, a second screen regarding an operation for resuming the job which the second interrupt factor has impacted, wherein, based on the first interrupt factor that has impacted the job instructed by a previous user who has logged in to the job processing apparatus, the display unit displays the first screen while the previous user is logging in to the job processing apparatus, wherein, based on the second interrupt factor that has impacted the job instructed by the previous user, the display unit displays the second screen while the previous user is logging in to the job processing apparatus, wherein, based on the first interrupt factor that has impacted the job instructed by the previous user, the display unit displays the first screen while a different user from the previous user is logging in to the job processing apparatus, and wherein, based on the second interrupt factor that has impacted the job instructed by the previous user, the display unit does not display the second screen while the different user from the previous user is logging in to the job processing apparatus.

Further features of the present invention will become apparent from the following description of exemplary embodiments with reference to the attached drawings.

BRIEF DESCRIPTION OF THE DRAWINGS

FIG. 5 illustrates a configuration of a screen according to the present exemplary embodiment.

FIGS. 17A to 17D each illustrate a configuration of a screen according to the second exemplary embodiment.

DESCRIPTION OF THE EMBODIMENTS

In the following description, exemplary embodiments of the present invention will be described in detail with reference to the accompanying drawings. However, the exemplary embodiments that will be described below do not limit the present invention defined according to the claims, and not all of combinations of features that will be described in the exemplary embodiments are necessarily essential to a solution of the present invention.

In a first exemplary embodiment, a job processing apparatus, when a first interrupt factor that has impacted a job in process is resolved, displays a first screen prompting a user to perform an operation for resuming the job which the first interrupt factor has impacted. Further, the job processing apparatus, when a second interrupt factor that has impacted a job in process is resolved, displays a second screen prompting the user to perform an operation for resuming the job which this second interrupt factor has impacted. Then, based on a type of an interrupt factor that has impacted a job instructed by the previous user who has logged in to this job processing apparatus, the job processing apparatus determines whether to display the first screen or the second screen while the different user from this previous user is logging in.

Now, details thereof will be described.

A configuration of hardware of a multi-functional peripheral (MFP) 103, which is one example of the job processing apparatus according to the first exemplary embodiment of the present invention, will be described with reference to a block diagram illustrated in FIG. 1.

The MFP 103 has a copy function of reading an original document to generate image data, and printing an image onto a sheet based on the generated image data. Further, the MFP 103 has a personal computer (PC) print function of receiving a print job from an external apparatus, such as a PC 104 and an external server 105, and printing a character and an image onto a sheet based on data with respect to which a print instruction is received. The printing by the print function may be color printing or may be monochrome printing.

The PC 104, for example, generates image data by application software, and transmits the generated image data to the MFP 103. Further, the PC 104, for example, generates Page Description Language (PDL) data with use of a printer driver. Then, a controller unit 100 of the MFP 103 generates bitmap data by rasterizing the PDL data transmitted from the PC 104 via a network 102.

The controller unit 100 is connected to the external apparatus, such as the PC 104 and the external server 105, via the network 102, and performs processing such as reception of a job from the external apparatus. The network 102 may be a local area network (LAN), or a wide area network (WAN), such as the Internet.

Figure 1:
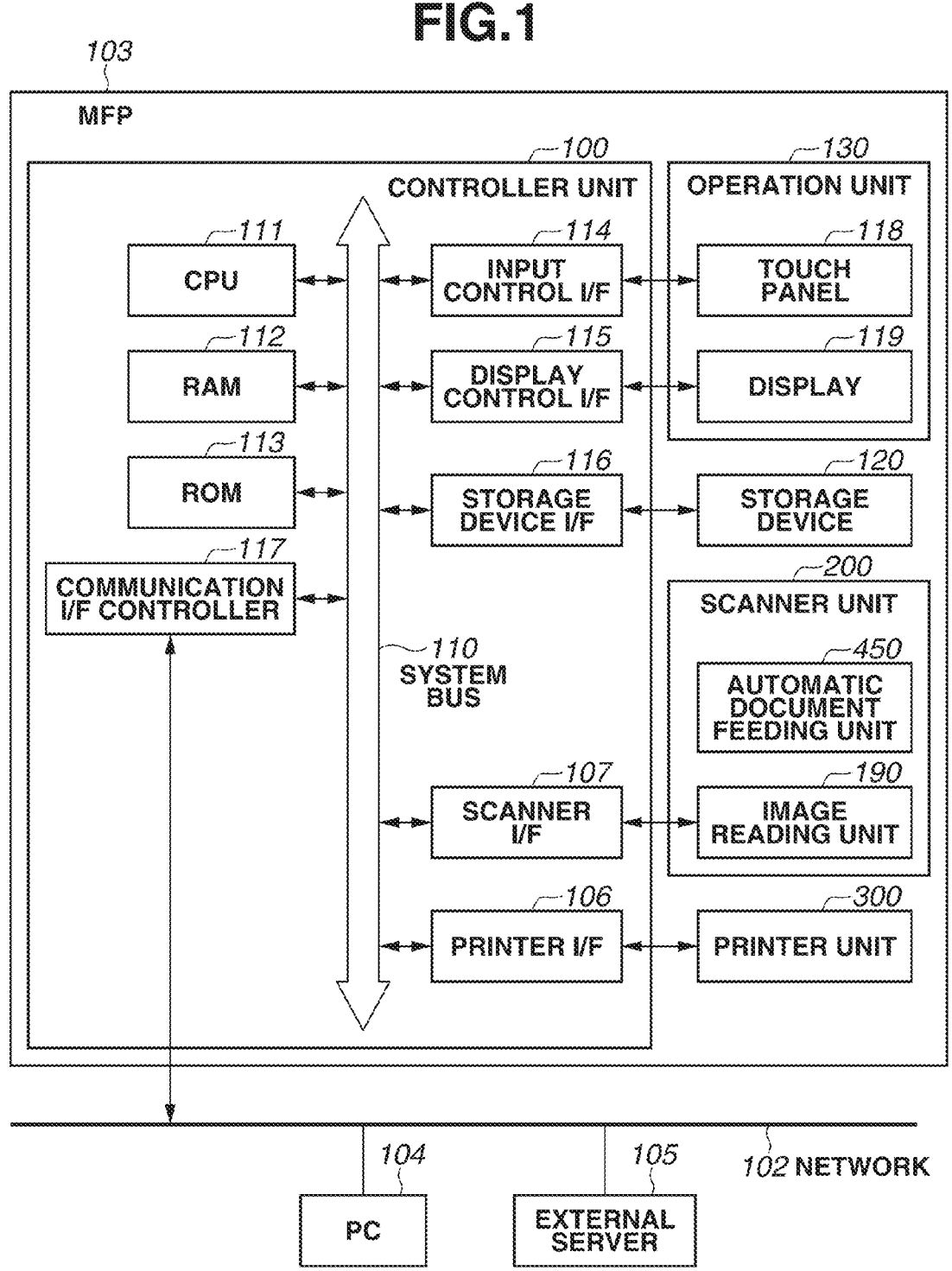
FIG. 1 is a block diagram illustrating a configuration of hardware of a multi-functional peripheral (MFP) according to an exemplary embodiment of the present invention.

FIG. 1 illustrates the MFP 103 configured in such a manner that the single PC 104 is connected to the MFP 103 via the network 102 by way of example, but the configuration of the MFP 103 is not limited thereto. The MFP 103 may be configured in such a manner that a plurality of PCs 104 is connected to the MFP 103 via the network 102. Further, FIG. 1 illustrates the MFP 103 configured in such a manner that the single external server 105 is connected to the MFP 103 via the network 102 by way of example, but the configuration of the MFP 103 is not limited thereto. The MFP 103 may be configured in such a manner that a plurality of external servers 105 is connected to the MFP 103 via the network 102.

The controller unit 100 of the MFP 103 is connected to a scanner unit 200 that is an image input device, and a printer unit 300 that is an image output device, and controls an input and an output of image information. The scanner unit 200 includes an automatic document feeding unit 450, which will be described below with reference to FIG. 2, and an image reading unit 190. The automatic document feeding unit 450 conveys original documents stacked on a document tray. The document reading unit 190 reads an image on the original document with use of an optical sensor, such as a charge-coupled device (CCD) sensor. Then, the image reading unit 190 transfers image data generated by reading the image on the original document, to the controller unit 100.

The printer unit 300 prints an image onto a sheet based on the image data input from the scanner unit 200, the PC 104, the external server 105, or the like.

The controller unit 100 is connected to an operation unit 130, which is one example of a user interface unit. The operation unit 130 includes a touch panel 118 and a display 119. The operation unit 130 has a function of presenting information to a user via the display 119. The display 119 is a liquid crystal display (LCD), and displays a status of the MFP 103 as well as an operation screen. The touch panel 118 is a touch panel sheet attached on the LCD. The operation unit 130 has a function of receiving various kinds of settings and inputs from the user via the touch panel 118 (this function is also referred to as software keys). The operation unit 130 displays, for example, a start key to be used to instruct the MFP 103 to start scanning, copying, or the like, and a stop key used to instruct the MFP 103 to stop an ongoing operation of the scanning, the copying, or the like, on the display 119. Further, the operation unit 130 displays an authentication key used to display an authentication screen for authenticating the user on the display 119, a numerical keypad used to input an arbitrary number, and a logout key used by the user to log out from the MFP 103, on the display 119. The operation unit 130 receives input for selecting these keys via the touch panel 118. In the present example, the operation unit 130 has been described which receives the various kinds of settings and inputs from the user via the touch panel 118 by way of example, but the present invention is not limited thereto. The operation unit 130 may include physical keys (also referred to as hardware keys), and the operation unit 130 may receive the various kinds of settings and inputs from the user via the physical keys.

The controller unit 100 is connected to a storage device 120. The storage device 120 is, for example, a hard disk drive (HDD) or a solid state drive (SSD).

The storage device 120 mainly stores the image data and information required to start up and actuate the computer (system software). Further, the storage device 120 stores software modules to be executed by a central processing unit (CPU) 111 that will be described below with reference to FIG. 3.

Further, the storage device 120 stores various kinds of control programs to be executed by the CPU 111 that are required to perform, for example, various kinds of processing illustrated in flowcharts as described below with reference to FIGS. 13 to 16. Further, the storage device 120 stores a display control program for displaying various kinds of screens on the display 119, a program for carrying out the rasterization, and the like. The CPU 111 performs various kinds of operations according to the present exemplary embodiment by reading out the programs stored in the storage device 120 and developing these programs on a random access memory (RAM) 112.

Figure 6:
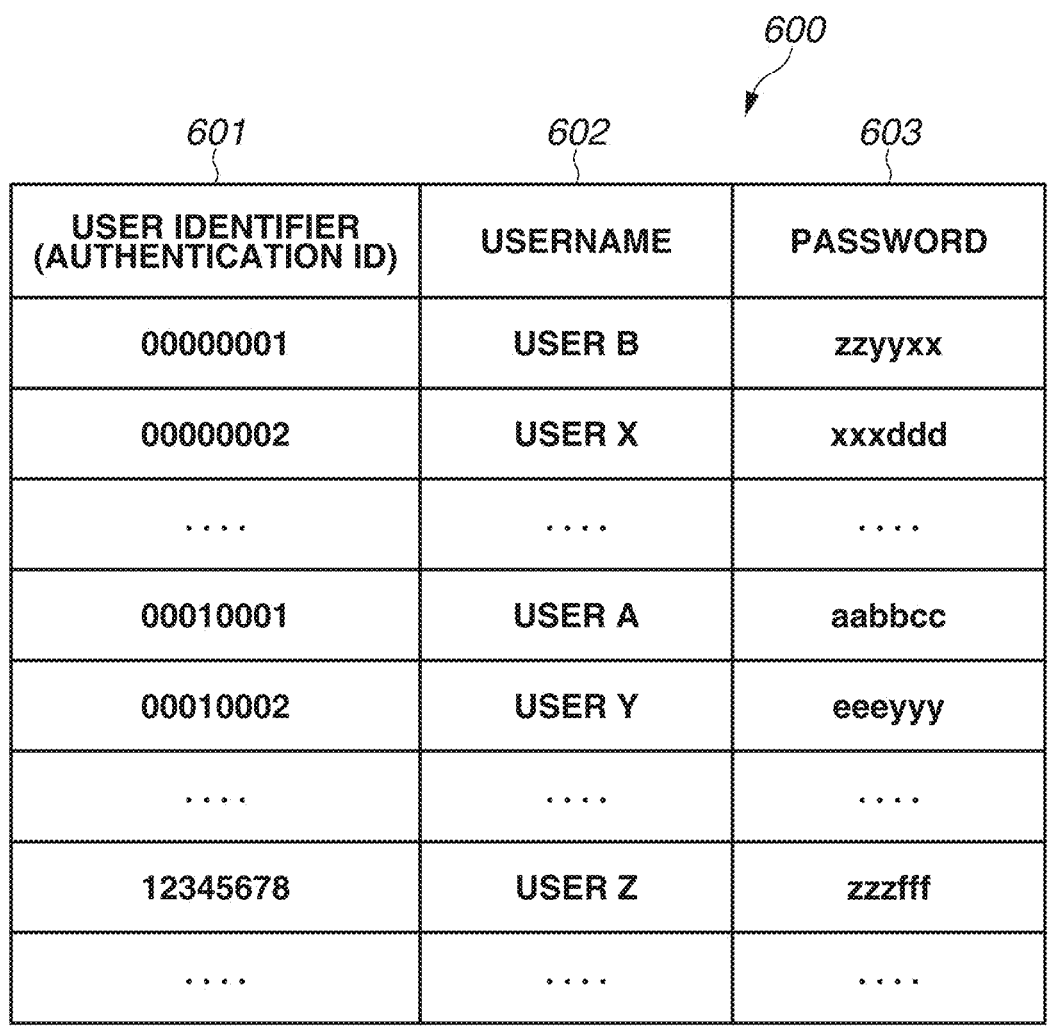
FIG. 6 is a schematic view illustrating a table according to the present exemplary embodiment.

Further, the storage device 120 stores a user information database (DB) as described below with reference to FIG. 6, which manages user information, such as a user identifier, a username, and a password for each user.

The controller unit 100 includes the CPU 111, the RAM 112, a read only memory (ROM) 113, and a communication interface (I/F) controller 117. Further, the controller unit 100 includes an input control I/F 114, a display control I/F 115, a storage device I/F 116, a printer I/F 106, and a scanner I/F 107. Each of the modules is connected to one another via a system bus 110.

The CPU 111 comprehensively controls the MFP 103 based on the control programs stored in the ROM 113, and the like. The CPU 111 reads out the control programs stored in the ROM 113, and performs various kinds of control processing, such as control of the reading of the scanner unit 200, control of the printing of the printer unit 300, and control of an update of firmware.

The RAM 112 is a readable and writable memory. Further, the RAM 112 is also a system work memory that allows the CPU 111 to operate. Further, the RAM 112 is used as an area for temporarily storing the image data input from the scanner unit 200, the PC 104, the external server 105, or the like. Further, the RAM 112 is used as a storage area for temporarily storing information indicating settings of a job received from the user via the touch panel 118.

The ROM 113 is a read-only memory. Further, the ROM 113 is a boot ROM. A boot program of the system is stored in the ROM 113 in advance.

Figure 3:
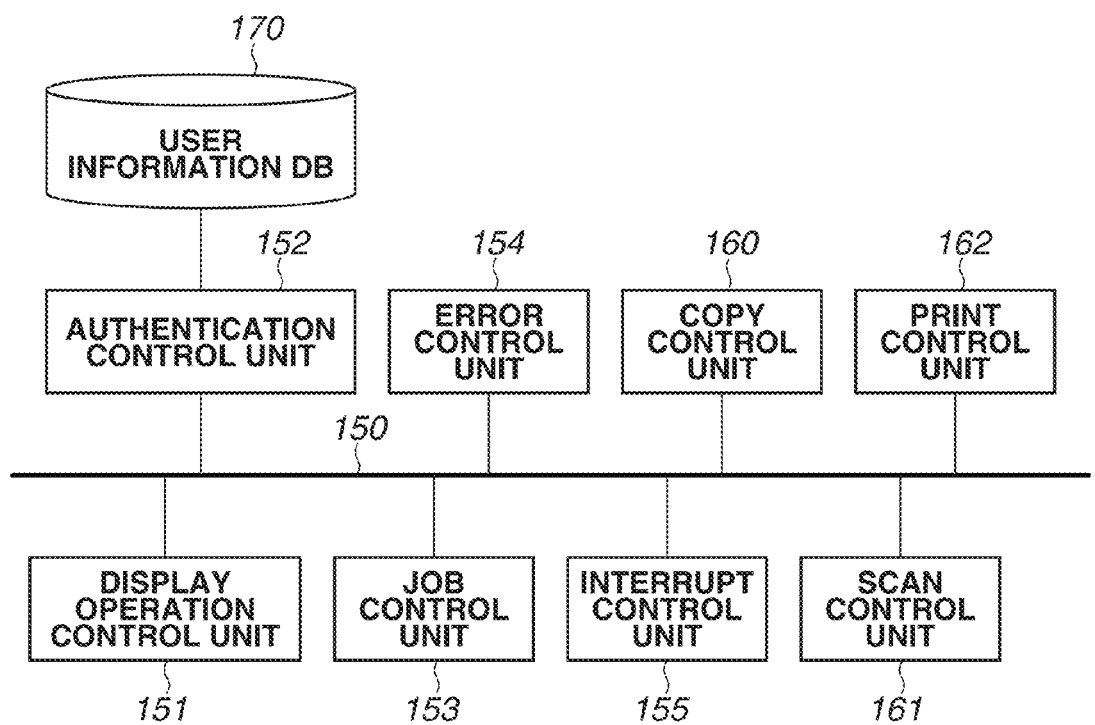
FIG. 3 is a block diagram illustrating a configuration of software modules of the MFP according to the present exemplary embodiment.

The software modules to be executed by the CPU 111 as described below with reference to FIG. 3 may be stored in the ROM 113 instead of the storage device 120. Further, the various kinds of necessary control programs to be executed by the CPU 111 to perform, for example, the various kinds of processing illustrated in the flowcharts as described below with reference to FIGS. 13 to 16 may be stored in the ROM 113 instead of the storage device 120. Further, the display control program for displaying the various kinds of screens on the display 119, the program for carrying out the rasterization, and the like may be stored in the ROM 113 instead of the storage device 120. In this case, the CPU 111 performs the various kinds of operations according to the present exemplary embodiment by reading out the programs stored in the ROM 113 and developing these programs on the RAM 112.

The storage device I/F 116 is an interface for connecting the storage device 120 and the controller unit 100 to each other. The storage device I/F 116 transmits the data to be written into the storage device 120 from the controller unit 100 to the storage device 120. Further, the storage device I/F 116 transmits the data read out from the storage device 120 to the controller unit 100.

The communication I/F controller 117 connects the controller unit 100 to the network 102. The communication I/F controller 117 transmits the image data, various kinds of information (for example, setting information of the job received from the user via the touch panel 118), and the like to, for example, the PC 104 and the external server 105. Further, the communication I/F controller 117 receives the updated firmware, various kinds of information, and the like from, for example, the PC 104 and the external server 105.

The input control I/F 114 is an interface for connecting the touch panel 118 and the controller unit 100 to each other. The input control I/F 114 transmits the information input by the user via the touch panel 118 to the CPU 111.

The display control I/F 115 is an interface for connecting the display 119 and the controller unit 100 to each other. The display control I/F 115 outputs the image data to be displayed on the display 119 from the controller unit 100 to the display 119.

The scanner I/F 107 is an interface for connecting the scanner unit 200 and the controller unit 100 to each other. The scanner I/F 107 outputs the image data acquired by the image reading unit 190 from the scanner unit 200 to the controller unit 100.

The printer I/F 106 is an interface for connecting the printer unit 300 and the controller unit 100 to each other. The printer I/F 106 transfers the image data that is printed by the printer unit 300 from the controller unit 100 to the printer unit 300.

Next, operations of the scanner unit 200 and the printer unit 300 will be described with reference to a cross-sectional view illustrated in FIG. 2.

First, the operation of the scanner unit 200 will be described with reference to the cross-sectional view illustrated in FIG. 2.

The scanner unit 200 includes the automatic document feeding unit 450. The automatic document feeding unit 450 includes a document tray 30 for stacking an original document or original documents 32, and feeds the original document(s) 32 stacked on the document tray 30. Then, the scanner unit 200 reads an image or images on the fed original document(s) 32 at a fixed position of an optical system. Now, this operation will be described specifically.

The automatic document feeding unit 450 includes the document tray 30 where a document bundle constituted by one or more original document(s) 32 is stacked, a feeding roller 1 and a separation pad 21 that restricts a protrusion of the document bundle from the document tray 30 and an advancement of the document bundle to a downstream side before a start of the conveyance of the original document(s) 32.

The feeding roller 1 is dropped onto a document surface of the document bundle stacked on the document tray 30, and is rotated thereon. By this rotation, the original document 32 located on an uppermost surface of the document bundle is fed. The plurality of original documents 32 fed by the feeding roller 1 is fed while being separated one by one under actions of a separation roller 2 and the separation pad 21. This separation is realized by a known retard separation technique.

The original document 32 separated by the separation roller 2 and the separation pad 21 is conveyed to a registration roller 4 by a pair of conveyance rollers 3. Then, the conveyed original document 32 abuts on the registration roller 4. Thus, a skew that might be caused during the conveyance of the original document 32 can be corrected. A feeding path, via which the original document 32 is conveyed in a direction toward a feeding-reading glass 201 after passing through the registration roller 4, is disposed on a downstream side of the registration roller 4.

The original document 32 conveyed to the feeding path is conveyed onto a platen by a large roller 7 and a feeding roller 5. At this time, the large roller 7 contacts the feeding-reading glass 201. Then, the scanner unit 200 reads the image on the surface of the original document 32 passing through the feeding-reading glass 201. The original document 32 fed by the large roller 7 passes through a conveyance roller 6, and moves between a roller 16 and a discharge flapper. Then, the original document 32 is discharged onto a document discharge tray 31 via the discharge flapper and a discharge roller 8.

The scanner unit 200 can read an image on a back side of the original document 32 by reversing the original document 32. More specifically, the discharge roller 8 is rotated in an opposite direction to switch the discharge flapper, nipping the original document 32 to deliver the original document 32 to a reversing path 19. The delivered original document 32 abuts on the registration roller 4 from the reversing path 19, which corrects again a skew that might be caused during the conveyance of the original document 32. After that, the original document 32 is delivered to the feeding-reading glass 201 again by the feeding roller 5 and the large roller 7. Then, the scanner unit 200 reads the image on the back side of the original document 32 passing through the feeding-reading glass 201.

Figure 2:
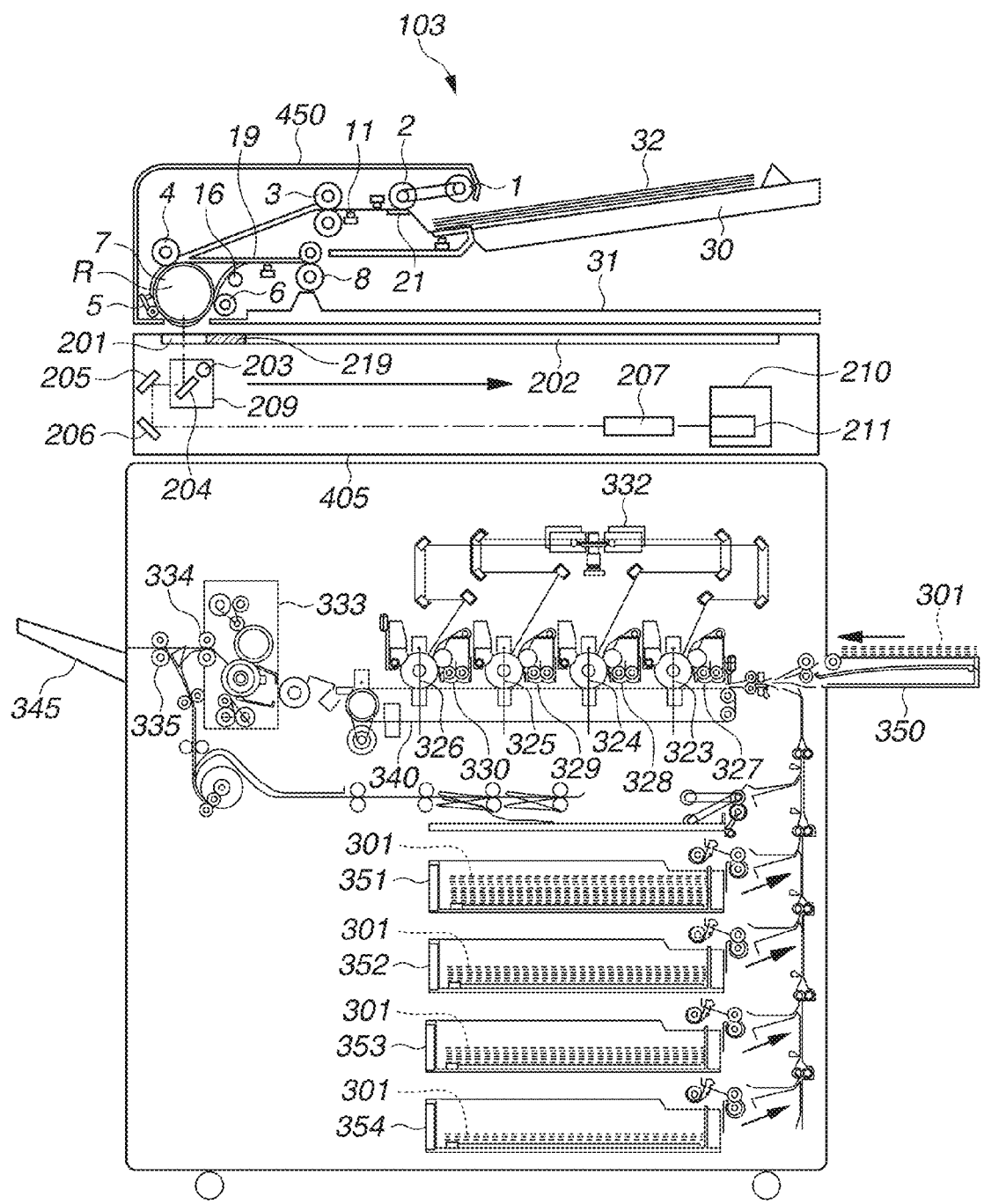
FIG. 2 is a cross-sectional view illustrating the configuration of the MFP according to the present exemplary embodiment.

On the other hand, when reading the original document placed on a platen glass 202, the scanner unit 200 scans the original document placed on the platen glass 202 by moving an optical scanner unit 209 in a sub scanning direction indicated by an arrow illustrated in FIG. 2. By this scanning, the scanner unit 200 optically reads the image information recorded on the original document.

The original document 32 placed on the document tray 30 or the original document placed on the platen glass 202 is read by the following optical system. This optical system includes the feeding-reading glass 201, the platen glass 202, the optical scanner unit 209 including an optical lamp 203 and a mirror 204, mirrors 205 and 206, a lens 207, and a CCD sensor unit 210. In the present exemplary embodiment, the CCD sensor unit 210 includes a CCD 211 (a CCD for reading a color image (Red-Green-Blue (RGB)) (a three line sensor unit) and a CCD for reading a monochrome image (a single line sensor unit)).

The image information read by this optical system is photoelectrically converted, and is input into the controller unit 100 as the image data. In the present exemplary embodiment, the optical system included in the scanner unit 200 has been described as a reduction optical system that forms an image with light reflected from the original document 32 on the CCD sensor, but is not limited thereto. The optical system included in the scanner unit 200 may be an equal magnification optical system that forms an image with the light reflected from the original document 32, on a contact image sensor (CIS).

Next, the operation of the printer unit 300 will be described with reference to the cross-sectional view illustrated in FIG. 2.

The printer unit 300 performs an operation of outputting the image onto a sheet 301 (a print operation) based on the image data transferred to the printer unit 300. Now, this operation will be described specifically.

The image data transferred to the printer unit 300 is converted into laser light corresponding to the image data by a laser unit 332. Then, photosensitive drums (323 to 326) are illuminated with this laser light, and electrostatic latent images according to the image data are formed on the photosensitive drums (323 to 326). Developing units (327 to 330) attach toner (developing agents) to portions of the photosensitive drums (323 to 326) where the latent images are formed. In the case of a color machine, the printer unit 300 includes four photosensitive drums (323 to 326) and four developing units (327 to 330) for cyan, yellow, magenta, and black.

Further, the printer unit 300 includes cassettes (351 to 354) and a manual feeding tray 350 as sheet storage portions (also referred to as sheet feeding decks). The cassettes (351 to 354) can each store a plurality of sheets 301 (for example, 600 sheets). The cassettes (351 to 354) mainly store plain paper and paper of a standard size. On the other hand, the manual feeding tray 350 can hold a plurality of sheets 301 (for example, 100 sheets). The manual feeding tray 350 mainly holds preprint paper, special paper, and paper of an irregular size.

The printer unit 300 transfers the toner attached on the photosensitive drums (323 to 326) onto the sheet 301 fed from any of the cassettes (351 to 354) and the manual feeding tray 350. After that, the sheet 301 with the transferred toner is conveyed to a fixing unit 333. Then, the toner is fixed on the sheet 301 with heat and pressure. After passing through the fixing unit 333, the sheet 301 is discharged onto a discharge tray 345 (a discharge unit) included in the MFP 103 by conveyance rollers 334 and 335.

The MFP 103 has been described as being the color machine including the four photosensitive drums (323 to 326) and the four developing units (327 to 330), but is not limited thereto. The present invention can be in a similar manner applied to the MFP 103 that is a monochrome machine including a single photosensitive drum 326 and a single developing unit 330.

The MFP 103 has been described with respect to the method for printing the image onto the sheet 301 by the electrophotographic method, but is not limited thereto. The printing method may be any method for printing the image onto the sheet 301, for example, by the inkjet method as long as the MFP 103 can print the image onto the sheet 301. The present invention can also be applied in a similar manner to another method (for example, the thermal transfer method).

Subsequently, a configuration of the software modules of the MFP 103 according to the first exemplary embodiment will be described with reference to a block diagram illustrated in FIG. 3.

The MFP 103 includes a control unit for each function as the software module. This software module is stored in the storage device 120 or the ROM 113.

The control units include, for example, a display operation control unit 151, an authentication control unit 152, a job control unit 153, an error control unit 154, and an interrupt control unit 155. Further, the control units include, for example, a copy control unit 160 for controlling the copy operation, a scan control unit 161 for controlling the scan operation, and a print control unit 162 for controlling the print operation. The CPU 111 executes the programs stored in the storage device 120 or the ROM 113 to realize these control units.

More specifically, when the user starts up the MFP 103 or uses its capability (hereinafter referred to as a function) such as the copying, facsimile (FAX), scan transmission, and the printing, the CPU 111 develops the program stored in the storage device 120 or the ROM 113 on the RAM 112. Then, the CPU 111 issues a job when processing is started in the control unit of each function. Then, the job issued by the CPU 111 is managed by the job control unit 153.

The job refers to a series of processing performed by each function such as the scanning, the transmission, the copying, and the printing. For example, a "copy job" is a job in which the MFP 103 performs a series of processing for printing the image onto the sheet 301 via the printer unit 300 based on the image data acquired by reading the image on the original document 32 via the scanner unit 200. Further, for example, a "print job" is a job in which the MFP 103 performs a series of processing procedures of printing the image onto the sheet 301 via the printer unit 300 based on the image data received from the external apparatus, such as the PC 104 and the external server 105, or the image data stored in the storage device 120. Further, for example, a "scan transmission job" is a job in which the MFP 103 performs a series of processing for transmitting the image data acquired by reading the image on the original document 32 via the scanner unit 200 to the external apparatus by an electronic mail or the like. The processing for reading the image on the original document 32 via the scanner unit 200 may be referred to as a "scan job", and the processing for transmitting the image data acquired by reading the image on the original document 32 to the external apparatus by the FAX, the electronic mail, or the like may be referred to as a "transmission job".

Figure 4:
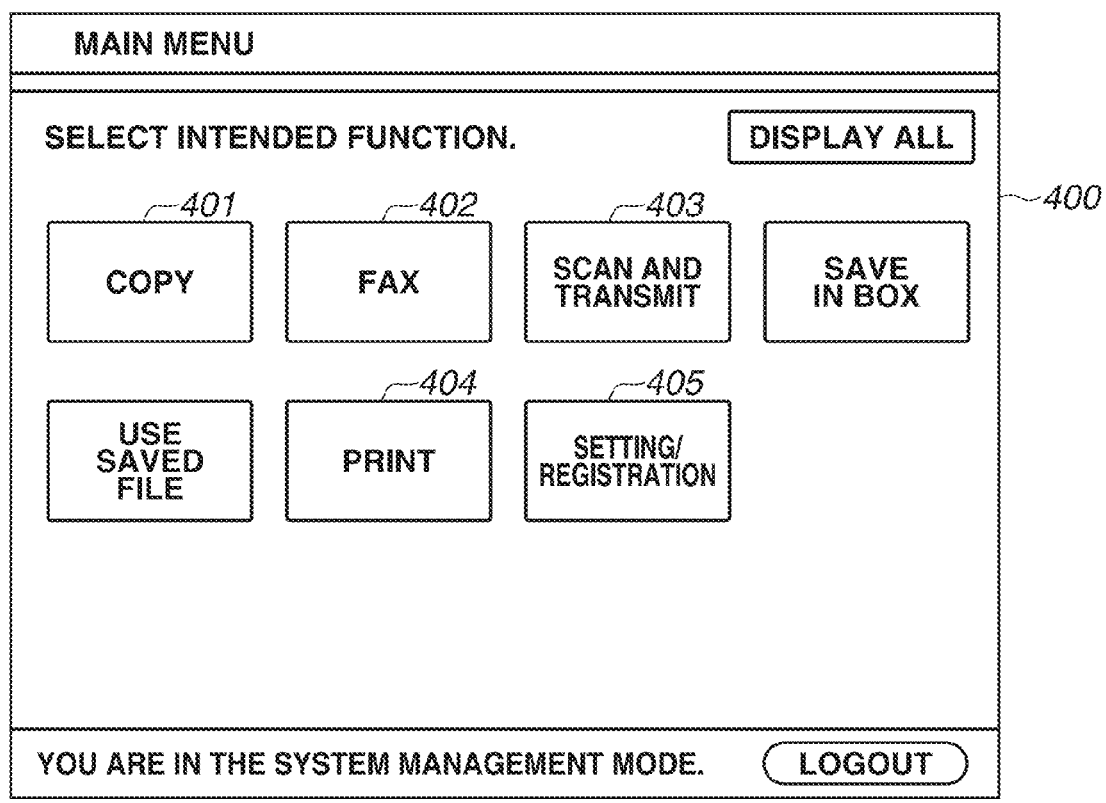
FIG. 4 illustrates a configuration of a screen according to the present exemplary embodiment.

Each function is called up via a main screen 400 illustrated in FIG. 4 that is displayed on the display 119. The main screen 400 is displayed on the display 119 when user authentication is successful, which will be described below. Further, the main screen 400 is displayed on the display 119 when the user presses a key for returning from an execution screen of each function to the main screen 400.

Buttons displayed on the main screen 400 include buttons for calling up the various kinds of functions, such as a copy function 401, a FAX function 402, a scan transmission function 403, and a print function 404. The various kinds of functions, such as the copy function 401, the FAX function 402, the scan transmission function 403, and the print function 404 are called up when the users presses any of the buttons on the main screen 400 displayed on the display 119.

At this time, a screen for using the called up function is displayed on the display 119. For example, if the copy function 401 is selected by the user, an execution screen for using the copy function 401 is displayed on the display 119. For example, if the FAX function 402 is selected by the user, an execution screen for using the FAX function 402 is displayed on the display 119. For example, if the scan transmission function 403 is selected by the user, an execution screen 500 illustrated in FIG. 5 is displayed on the display 119. The execution screen 500 is used to transmit the image data generated by reading the image on the original document 32 (hereinafter referred to as scanned image data) to an arbitrary destination by the electronic mail Further, for example, if the print function 404 is selected by the user, an execution screen for carrying out the printing (the print job) based on the image data received from the external apparatus, such as the PC 104 and the external server 105, is displayed on the display 119.

The display operation control unit 151 controls the input control I/F 114 and the display control I/F 115 based on the control by the CPU 111. For example, the display operation control unit 151 presents a display on the display 119 via the display control I/F 115 based on an instruction from another control unit. Further, for example, the display operation control unit 151 acquires the information input by the user via the touch panel 118 via the input control I/F 114 based on an instruction from another control unit. Then, the display operation control unit 151 notifies the corresponding control unit of the information and the data acquired via the input control I/F 114 via a control bus 150 as necessary.

The authentication control unit 152 has a function of, for example, registering, deleting, and updating the user information, and performs authentication processing for identifying the user based on the control by the CPU 111. Then, the authentication control unit 152 determines whether an operator of the MFP 103 is a valid user having an operation authority based on whether the user information subjected to the authentication processing via the authentication screen matches user information stored in a user information DB 170. The user information DB 170 is the database storing the user information including the identifier for uniquely identifying the user (hereinafter referred to as the user identifier), and is stored in the storage device 120.

In the present exemplary embodiment, a term "login" will be used to refer to starting of a session to bring the MFP 103 into an operable state by the user subjected to the authentication processing performed by the authentication control unit 152 and determined to be the valid user having the operation authority. On the other hand, a term "logout" will be used to refer to ending of the session by the user determined to be the valid user having the operation authority.

The authentication control unit 152 may have a function of, for example, registering, deleting, and updating group information. In this case, an identifier for uniquely identifying a group of the user (hereinafter referred to as a group identifier) is stored in the user information DB 170. The authentication control unit 152 may determine whether the operator of the MFP 103 is the valid user having the operation authority based on whether the information of the user subjected to the authentication processing belongs to the group stored in the user information DB 170.

The authentication processing performed by the authentication control unit 152 may be modified such that connection to the external server 105 (an authentication server) is established via the communication I/F controller 117 to use a result of authentication carried out by the external server 105.

Next, one example of the authentication screen displayed on the display 119 will be described. For example, the authentication screen is displayed on the display 119 when a key for calling up the authentication screen (hereinafter referred to as an authentication key) is pressed. The authentication key may be a software key or a hardware key. Items displayed on the authentication screen include a form for receiving an input of an authentication identification (ID) from the user, a form for receiving an input of a password from the user, a login button, and the like.

Next, an authentication table 600 as shown in an example illustrated in FIG. 6, will be described. A user identifier (an authentication ID) 601, a username 602, and a password 603 are registered for each user in the authentication table 600. The authentication table 600 is stored in the storage device 120.

After inputting the authentication ID and the password into the forms on the authentication screen, the user presses the login button. Then, the CPU 111 determines whether a pair of the authentication ID and the password input in the forms on the authentication screen matches a pair of the user identifier (the authentication ID) 601 and the password 603 registered in the authentication table 600.

If the pair of the authentication ID and the password input in the forms on the authentication screen matches the pair of the user identifier (the authentication ID) 601 and the password 603 registered in the authentication table 600, the user authentication succeeds. On the other hand, if the pair of the authentication ID and the password input in the forms on the authentication screen does not match the pair of the user identifier (the authentication ID) 601 and the password 603 registered in the authentication table 600, the user authentication fails.

Figure 7:
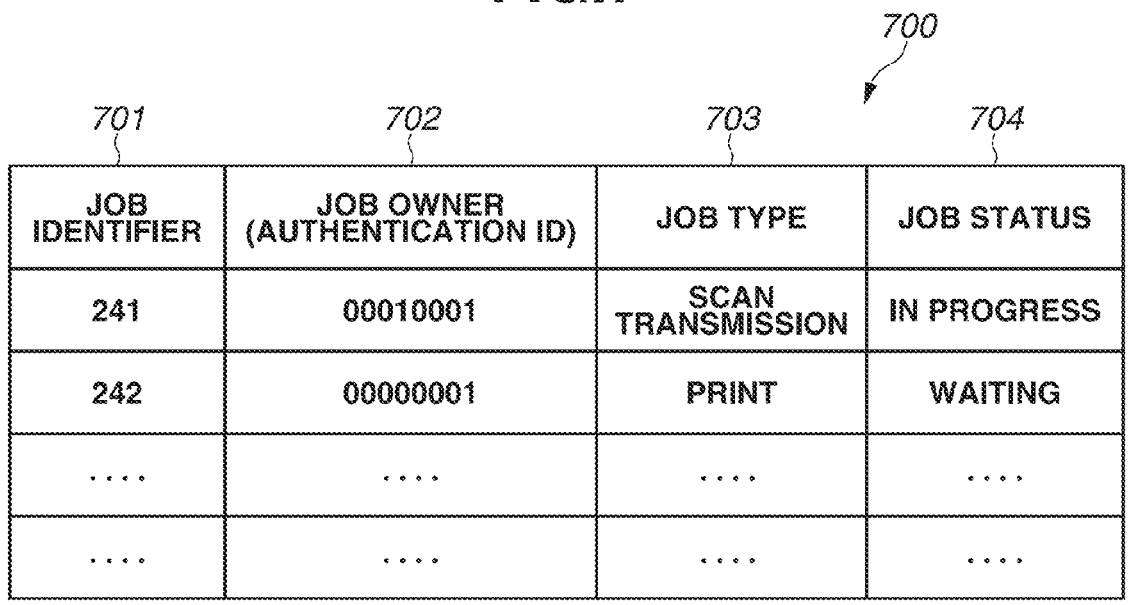
FIG. 7 is a schematic view illustrating a table according to the present exemplary embodiment.

The job control unit 153 manages information about the job issued by the CPU 111 (i.e., information about the job that is carried out in each function according to an instruction) with use of a job status table 700 illustrated in FIG. 7. The job status table 700 is stored in the storage device 120.

As illustrated in FIG. 7, the job status table 700 is a table in which a job identifier 701, a job owner (an authentication ID) 702, a job type 703, and a job status 704 are registered for each job.

The job identifier 701 is a unique identifier for uniquely identifying the job. The job identifier 701 is issued based on the instruction to carry out the job issued by the control unit for each function.

The user identifier (the authentication ID) 601 of the user who owns the job (an owner) is registered for the job owner 702. The owner of the job is uniquely identified by the user identifier (the authentication ID) 702.

The owner of the job refers to, for example, a user who instructs the MFP 103 to carry out the copy job, a user who instructs the MFP 103 to carry out the scan transmission job, or a user who inputs the print job from the PC 104 into the MFP 103 via the printer driver or the like.

The job type 703 is information indicating a type of the job, such as the copy job, the scan transmission job, the FAX job, and the print job.

The job status 704 is information indicating a status of the job. As the status of the job, the job status 704 indicates, for example, a state of the job (for example, an running state, a waiting state, or canceled), a progress status of the running job (for example, the job is in progress or interrupted), or a result of the completed job (for example, the execution has succeeded or the execution has failed).

For example, referring to a job having "241" as the job identifier 701, the user identifier of the owner (702) of this job is "00010001", the type (703) of this job is "SCAN TRANSMISSION JOB", and the status (704) of this job is "IN PROGRESS".

For example, referring to a job having "242" as the job identifier 701, the user identifier of the owner (702) of this job is "00000001", the type (703) of this job is "PRINT JOB", and the status (704) of this job is "WAITING".

The error control unit 154 performs processing for resuming the job (for example, processing for recovering the function) after resolution of various errors that have occurred in the MFP 103.

Figure 8A:
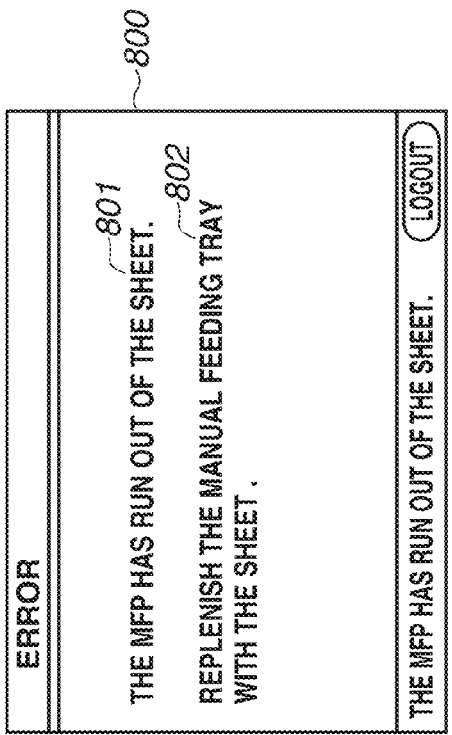
FIGS. 8A to 8D each illustrate a configuration of a screen according to the present exemplary embodiment.

For example, if a jam has occurred while the automatic document feeding unit 450 is conveying the original document 32, the scan control unit 161 stores the number of page(s) of the normally scanned original document(s) 32 into the RAM 112, and interrupts the scan operation. Then, the error control unit 154 instructs the display operation control unit 151 to generate screen data (for example, a message notifying the user that the jam of the original document 32 has occurred) that is to be displayed on the display 119. Then, the display operation control unit 151 displays the generated screen data on the display 119 via the display control I/F 115. At this time, for example, an error screen 800 illustrated in FIG. 8A is displayed on the display 119. The error screen 800 illustrated in FIG. 8A notifies the user that the jam of the original document 32 has occurred by using, for example, a message 801. Further, the error screen 800 prompts the user to resolve the jam of the original document 32 by using, for example, a message 802.

Figure 9A:
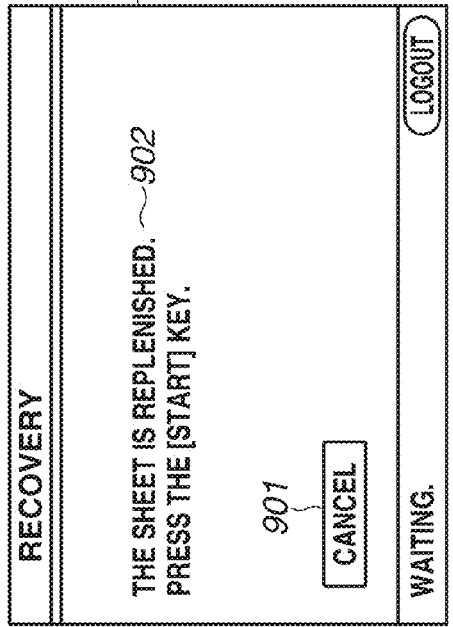
FIGS. 9A to 9D each illustrate a configuration of a screen according to the present exemplary embodiment.

Upon confirming the error screen 800 illustrated in FIG. 8A that is displayed on the display 119, the user removes the jammed original document 32 from the automatic document feeding unit 450. Then, the error control unit 154 instructs the display operation control unit 151 to delete the screen data (for example, the message 801 notifying the user that the jam has occurred) displayed on the display 119 according to the resolution of the jam of the original document 32. Then, the error control unit 154 instructs the display operation control unit 151 to generate screen data (for example, a message notifying the user to execute a recovery) that should be displayed on the display 119. Then, the display operation control unit 151 displays the generated screen data on the display 119 via the display control I/F 115. At this time, for example, a recovery screen 900 illustrated in FIG. 9A is displayed on the display 119. The recovery screen 900 illustrated in FIG. 9A prompts the user to perform an operation for resuming the job in which the jam of the original document 32 has occurred by using, for example, a message 902.

For example, upon confirming the recovery screen 900 illustrated in FIG. 9A that is displayed on the display 119 after the jam of the original document 32 is resolved, the user sets the original document(s) 32 on the document tray 30. At this time the user sets the original document(s) 32 on the document tray 30 while arranging the original document(s) 32 to be set, in order so that a first page of the original document(s) 32 is scanned first, for example. Then, the user presses the start key after setting the original document(s) 32 on the document tray 30. By this operation, the scan processing interrupted due to the jam is resumed. At this time, the scan control unit 161 controls the image reading unit 190 to read the image(s) on the original document(s) 32 starting from a page that has not been normally scanned without reading the image(s) on the original document(s) 32 that has been normally scanned based on the number of page(s) stored in the RAM 112.

On the other hand, if the user presses a cancel key 901 upon confirming the recovery screen 900 illustrated in FIG. 9A that is displayed on the display 119 after the jam of the original document 32 is resolved, the scan processing interrupted due to the jam is canceled.

Figure 8B:
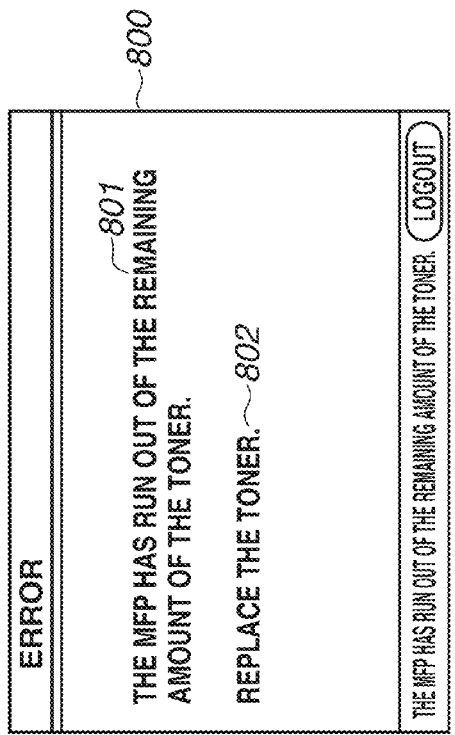
Figure 9B:
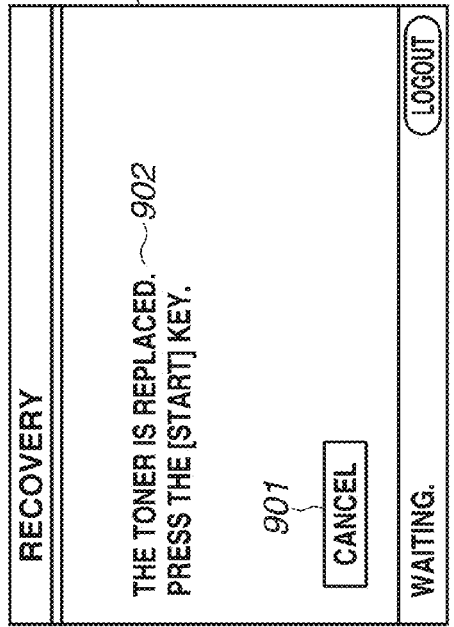

If a remaining amount runs out with respect to the sheet 301 stored (held) in the sheet storage portion (for example, the manual feeding tray 350), an error screen 800 illustrated in FIG. 8B and a recover screen 900 illustrated in FIG. 9B are displayed on the display 119.

The user is notified that the remaining amount has run out with respect to the sheet 301 stored (held) in the sheet storage portion (for example, the manual feeding tray 350) by a message 801 on the error screen 800 illustrated in FIG. 8B. Further, the user is prompted to resolve the run-out of the remaining sheet 301 to be stored (held) in the sheet storage portion (for example, the manual feeding tray 350) by a message 802 on the error screen 800 illustrated in FIG. 8B. Then, the user is prompted to perform an operation for resuming the job in which the remaining amount has run out with respect to the sheet 301 stored (held) in the sheet storage portion (for example, the manual feeding tray 350) by a message 902 on the recovery screen 900 illustrated in FIG. 9B.

Figure 8C:
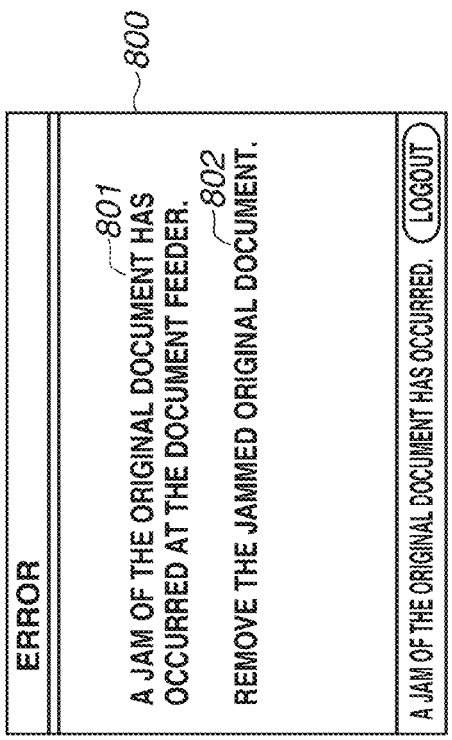
Figure 9C:
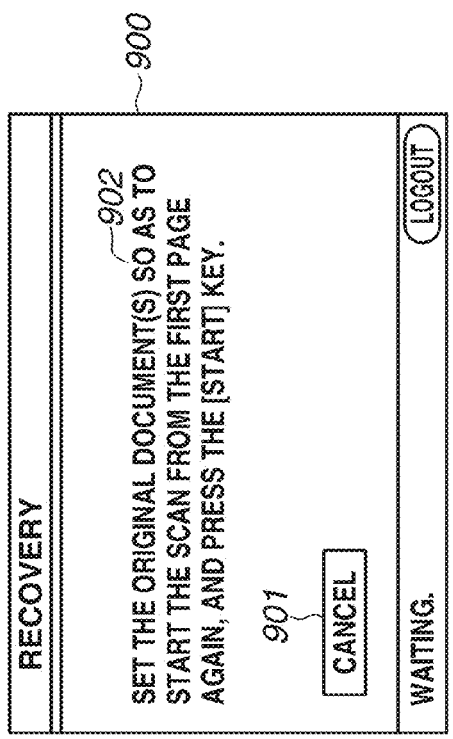

On the other hand, if a jam has occurred while the printer unit 300 is in operation (feeding the sheet 301), an error screen 800 illustrated in FIG. 8C and a recovery screen 900 illustrated in FIG. 9C are displayed on the display 119.

The user is notified that the jam has occurred while the printer unit 300 is in operation (feeding the sheet 301) by a message 801 on the error screen 800 illustrated in FIG. 8C. Further, the user is prompted to resolve the jam that has occurred while the printer unit 300 is in operation (feeding the sheet 301) by a message 802 on the error screen 800 illustrated in FIG. 8C. Then, the user is prompted to perform an operation for resuming the job in which the jam has occurred while the printer unit 300 is in operation (feeding the sheet 301) by a message 902 on the recovery screen 900 illustrated in FIG. 9C.

Figure 8D:
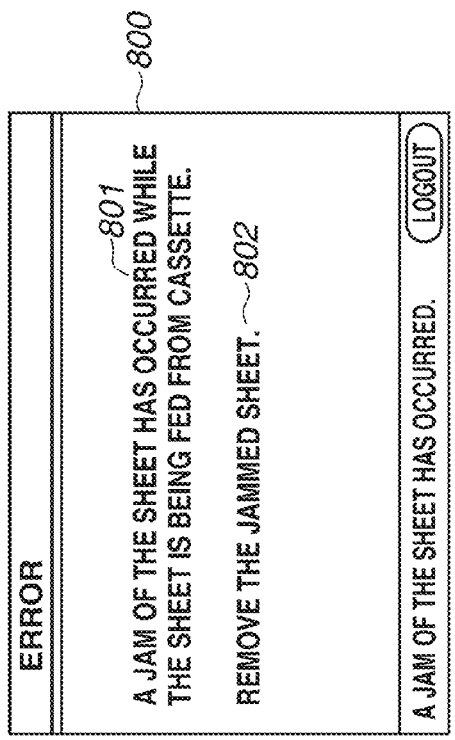
Figure 9D:
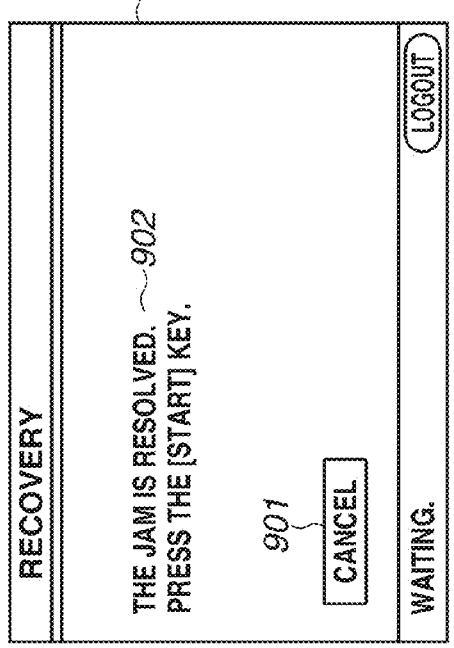

On the other hand, if a remaining amount has run out with respect to the toner for use in the printing while the printer unit 300 is in operation, an error screen 800 illustrated in FIG. 8D and a recovery screen 900 illustrated in FIG. 9D are displayed on the display 119.

The user is notified that the remaining amount has run out with respect to the toner for use in the printing while the printer unit 300 is in operation by a message 801 on the error screen 800 illustrated in FIG. 8D. Further, the user is prompted to resolve the run-out of the remaining amount of the toner for use in the printing by a message 802 on the error screen 800 illustrated in FIG. 8D. Then, the user is prompted to perform an operation for resuming the job in which the remaining amount has run out with respect to the toner for use in the printing while the printer unit 300 is in operation by a message 902 on the recovery screen 900 illustrated in FIG. 9D.

Next, the interrupt control unit 155 will be described.

Hereinafter, a term "interrupt login" will be used to refer to a case where while a job, such as the scanning and the printing, is running after a user (hereinafter referred to as a user A) logs in to the MFP 103, a user (hereinafter referred to as a user B) different from the user A logs in to the MFP 103 to use the MFP 103. Even when the user B logs in through the interrupt login, the job of the user A continues to operate in the background. Therefore, the user B cannot perform an operation (i.e., a function) which requires a hardware resource being used by the job of the user A.

The job control unit 153 manages selection of a resource which each function uses. Then, the job control unit 153 determines a hardware resource which is being used by the job currently running.

For example, if the user A is carrying out the scanning for the FAX transmission, the job control unit 153 determines that the scanner unit 200 is being used. Therefore, the user B, which has logged in through the interrupt login, cannot carry out a function supposed to use the scanner unit 200 (for example, the copy job, the FAX transmission job, and the scan transmission job). On the other hand, the user B can carry out a function supposed to use only the printer unit 300 without using the scanner unit 200 (for example, the print job that carries out the printing based on the image data received from the external apparatus, document data stored in the storage device 120, or the like).

In other words, when logging in to the MFP 103 through the interrupt login, the user B cannot use a function supposed to use the hardware resource occupied by the job of the user A. Therefore, a main screen 1000 illustrated in FIG. 10, which is different from the main screen 400 illustrated in FIG. 4, is displayed on the display 119 when the user B logs in to the MFP 103. In an example of the main screen 1000, the scanner unit 200 is being used by the job of the user A. Therefore, the screen display is controlled so as to prohibit the user B from selecting a function supposed to use the scanner unit 200 (for example, the copy job, the FAX transmission job, and the scan transmission job) (1001 to 1004). As a modification of the present exemplary embodiment, the screen display may be controlled so as to display a message indicating that the selected function is currently unusable on the display 119 after the user B, who has logged in through the interrupt login, selects the unusable function.

According to the first exemplary embodiment, the user A logs out from the MFP 103 before the user B logs in to the MFP 103 through the interrupt login as will be described below. The job of the user A continues to be carried out by the MFP 103 in the background even after the user A logs out from the MFP 103. Then, the user A logs in to the MFP 103 again after the user B logs out from the MFP 103. As a modification of the present exemplary embodiment, the MFP 103 may return to the state where the user A logs in when the user B logs out from the MFP 103.

Figure 11:
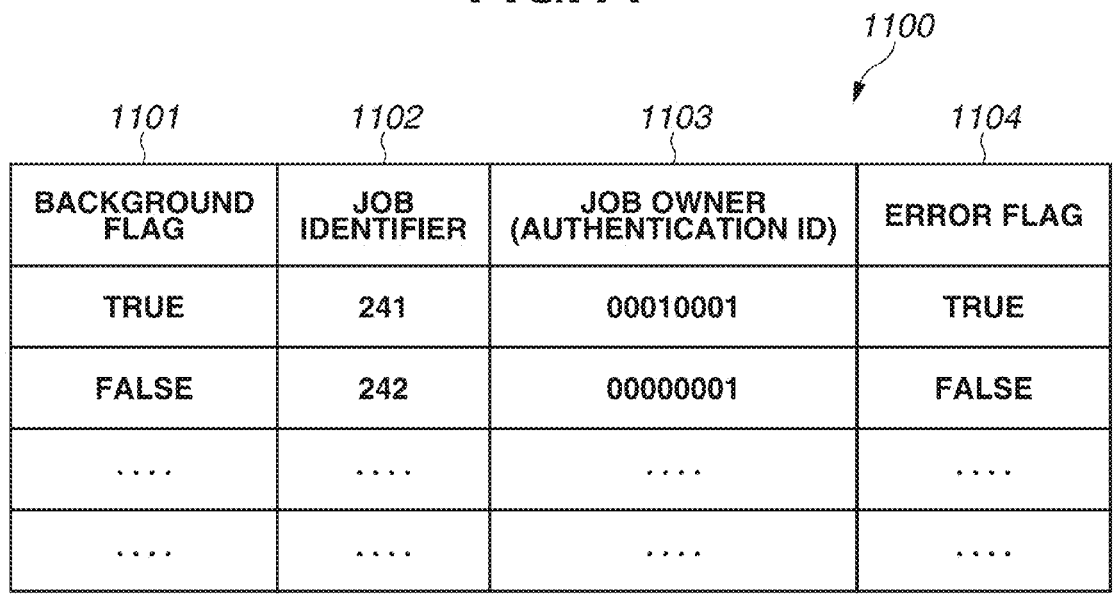
FIG. 11 is a schematic view illustrating a table according to the present exemplary embodiment.

The interrupt control unit 155 manages the information about the job running in the background with use of a job management table 1100 illustrated in FIG. 11. The job management table 1100 is stored in the storage device 120.

The job management table 1100 manages pieces of information about a plurality of jobs that does not conflict with each other in terms of the hardware resource of the MFP 103.

A background flag 1101 indicates whether the job of the user is operating in the background while the user is logging out from the MFP 103. In other words, the background flag 1101 indicates whether the job of the user different from the user currently logging in to the MFP 103 is operating in the background.

If a value of the background flag 1101 is "FALSE", this means that there is no job operating in the background. On the other hand, if the value of the background flag 1101 is "TRUE", this means that there is a job operating in the background.

For each job, a job identifier 1102 of this job and an owner (an authentication ID) 1103 of this job are registered in the job management table 1100.

Further, if an interrupt factor, such as the jam of the original document 32, the jam of the sheet 301 for use in the printing, the run-out of the remaining sheet 301, or the run-out of the remaining toner, has impacted the job when the value of the background flag 1101 is set to "TRUE", a value of the error flag 1104 is registered in the job management table 1100.

If the value of the error flag 1104 is "FALSE", this means that no interrupt factor has impacted the job operating in the background. On the other hand, if the value of the error flag 1104 is "TRUE", this means that an interrupt factor has impacted the job operating in the background.

In the first exemplary embodiment, the CPU 111 notifies the interrupt control unit 155 of the logout of the user A if the user B logs in as the interrupt login. Then, the interrupt control unit 155 inquiries of the job control unit 153 about whether there is a job currently running upon reception of notification of the logout of the user A. If it is determined that there is a currently running job, the CPU 111 registers the value of the background flag 1101 as "TRUE". On the other hand, if it is determined that there is no job currently running, the CPU 111 registers the value of the background flag 1101 as "FALSE".

Further, when the user B logs in as the interrupt login, the CPU 111 notifies the interrupt control unit 155 of the login of the user B. The notification of the login includes the user identifier (the authentication ID) 601 of the user B logging in to the MFP 103 as the interrupt login.

The interrupt control unit 155 reads out the value of the background flag 1101 from the job management table 1100 upon reception of notification of the login of the user B.

At this time, if the value of the background flag 1101 read out from the job management table 1100 is "FALSE", nothing is performed. On the other hand, if the value of the background flag 1101 read out from the job management table 1100 is "TRUE", the CPU 111 reads out the owner (the authentication ID) 1103 of the job running in the background from the job management table 1100. Then, the CPU 111 determines whether the user identifier (the authentication ID) 601 of the logging in user B and the owner (the authentication ID) 1103 of the job running in the background match each other. Then, if these user identifiers (the authentication IDs) 601 and 1103 match each other, the interrupt control unit 155 determines that the interrupt login is resolved. On the other hand, if these user identifiers (the authentication IDs) 601 and 1103 do not match each other, the interrupt control unit 155 determines that the interrupt login is ongoing.

On the other hand, the job control unit 153 notifies the interrupt control unit 155 of the job identifier 701 of the ended job when the job carried out by the MFP 103 has ended.

Subsequently, the interrupt control unit 155 determines whether the job identifier 701 of the ended job and the job identifier 1102 stored in the job management table 1100 match each other. If these job identifiers 701 and 1102 match each other, the CPU 111 determines that the job operating in the background is ended. Then, the display control unit 151 releases the control of the screen display described with reference to FIG. 10 (1001 to 1004) based on the end of the job running in the background during the interrupt login.

If an interrupt factor has impacted the job of the user A that is running in the background while the user B is operating the MFP 103 after logging in to the MFP 103 as the interrupt login, the MFP 103 operates in a manner as described now.

For example, after setting the plurality of original documents 32 on the document tray 30 to scan and transmit them, the user A logs out from the MFP 103 while the automatic document feeding unit 450 is conveying the original documents 32 and the image reading unit 190 is reading the images on the original documents 32. Subsequently, the user B logs in to the MFP 103 as the interrupt login. Then, suppose that the jam of the original document 32 has occurred during the conveyance of the original documents 32 by the automatic document feeding unit 450 while the user B is operating the MFP 103.

In the case where the jam of the original document 32 has occurred with no interrupt login ongoing, the MFP 103 can deal with this jam by interrupting the scan operation and displaying the error screen 800 illustrated in FIG. 8A on the display 119 to prompt the user to resolve the jam of the original document 32. Then, after the jam of the original document 32 is resolved by the user, the MFP 103 can display the recovery screen 900 illustrated in FIG. 9A on the display 119 to prompt the user to resume the scan processing interrupted due to the jam of the original document 32.

On the other hand, in the case where the jam of the original document 32 has impacted the job running in the background while the user B is logging in as the interrupt login, the owner of the job in which the jam of the original document 32 has occurred is the user A but the user operating the MFP 103 is the user B.

Suppose that the error screen 800 illustrated in FIG. 8A and the recovery screen 900 illustrated in FIG. 9A are displayed on the display 119 when the jam of the original document 32 has impacted the job running in the background while the interrupt login is ongoing. In this case, the user B logging in as the interrupt login instead of the owner of the relevant job, is notified of the message 801 regarding the occurrence of the jam of the original document 32, the message 802 regarding the resolution of the jam of the original document 32, and the message 902 regarding the recovery of the interrupted job.

Figure 10:
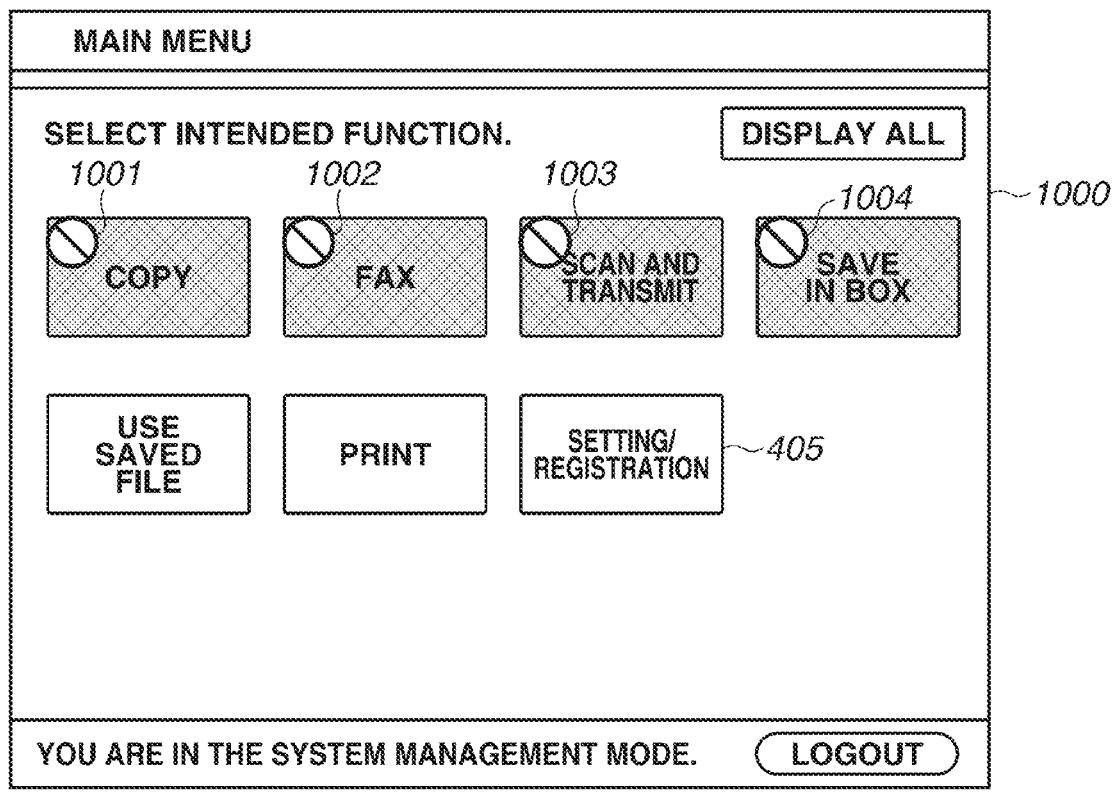
FIG. 10 illustrates a configuration of a screen according to the present exemplary embodiment.

As described with reference to FIG. 10, the user B cannot use the scanning as the function if the function of the job running in the background is the scanning. However, the user B is notified of the message 801 regarding the occurrence of the jam of the original document 32 during the scanning, the message 802 regarding the resolution of the jam of the original document 32, and the message 902 regarding the recovery of the interrupted scan job, are notified to the user B. Then, the user B, who is logging in as the interrupt login, may perform the operation for resolving the jam of the original document 32 (removing the jammed original document 32 from the automatic document feeding unit 450) after confirming the message 801 and the message 802 via the error screen 800 illustrated in FIG. 8A. Further, the user B, who is logging in as the interrupt login, may perform the operation for recovering the scan job (setting the original documents 32 on the document tray 30 again) after confirming the message 902 regarding the recovery of the interrupted scan job via the recovery screen 900 illustrated in FIG. 9A. However, the user B, who is logging in as the interrupt login, may inadvertently set the original documents 32 on the document tray 30 in an incorrect order unless he/she knows a correct order of the jammed original document 32. If the reading of the original documents 32 that has been interrupted in the scan job is resumed with the original documents 32 set on the document tray 30 in the incorrect order, the scan job may be executed with a result unintended by the owner of the job.

Similarly, if the function of the job running in the background is the printing, the user B cannot use the printing as the function. However, the user B is notified of the message 801 regarding the occurrence of the run-out of the sheet 301 in the manual feeding tray 350 during the printing, the message 802 for resolving the run-out of the sheet 301, and the message 902 regarding the recovery of the interrupted print job. Then, the user B, who is logging in as the interrupt login, may perform the operation for resolving the run-out of the sheet 301 (for example, replenishing the sheet 301) after confirming the message 801 and the message 802 via the error screen 800 illustrated in FIG. 8B. Further, the user B, who is logging in as the interrupt login, may perform the operation for recovering the print job (for example, returning the extracted sheet storage to an original position) after confirming the message 902 regarding the recovery of the interrupted print job via the recovery screen 900 illustrated in FIG. 9B. However, if the sheet 301 held in the manual feeding tray 350 is the preprint paper or the special paper, the user B, who is logging in as the interrupt login, may be unaware that the preprint paper or the special paper has been held in the manual feeding tray 350. Therefore, the user B, who is logging in as the interrupt login, may inadvertently replenish the manual feeding tray 350 with an incorrect sheet (for example, the plain paper) when recovering the interrupted print job. If the printing of the interrupted print job is resumed by replenishing the manual feeding tray 350 with the incorrect sheet, the execution of this print job may be executed with a result unintended by the owner of this job.

Therefore, in the first exemplary embodiment, the job processing apparatus, according to the resolution of the first interrupt factor that has impacted the running job, displays the first screen prompting the user to perform the operation for resuming the job which this first interrupt factor has impacted. Further, the job processing apparatus, when the second interrupt factor is resolved that has impacted the running job, displays the second screen prompting the user to perform the operation for resuming the job which the second interrupt factor has impacted. Then, the job processing apparatus, depending on the type of the interrupt factor that has impacted the job of the previous user who has logged in to the job processing apparatus, determines whether to display the first screen or the second screen while the user different from the previous user is logging in. Now, the details thereof will be described.

Figure 12:
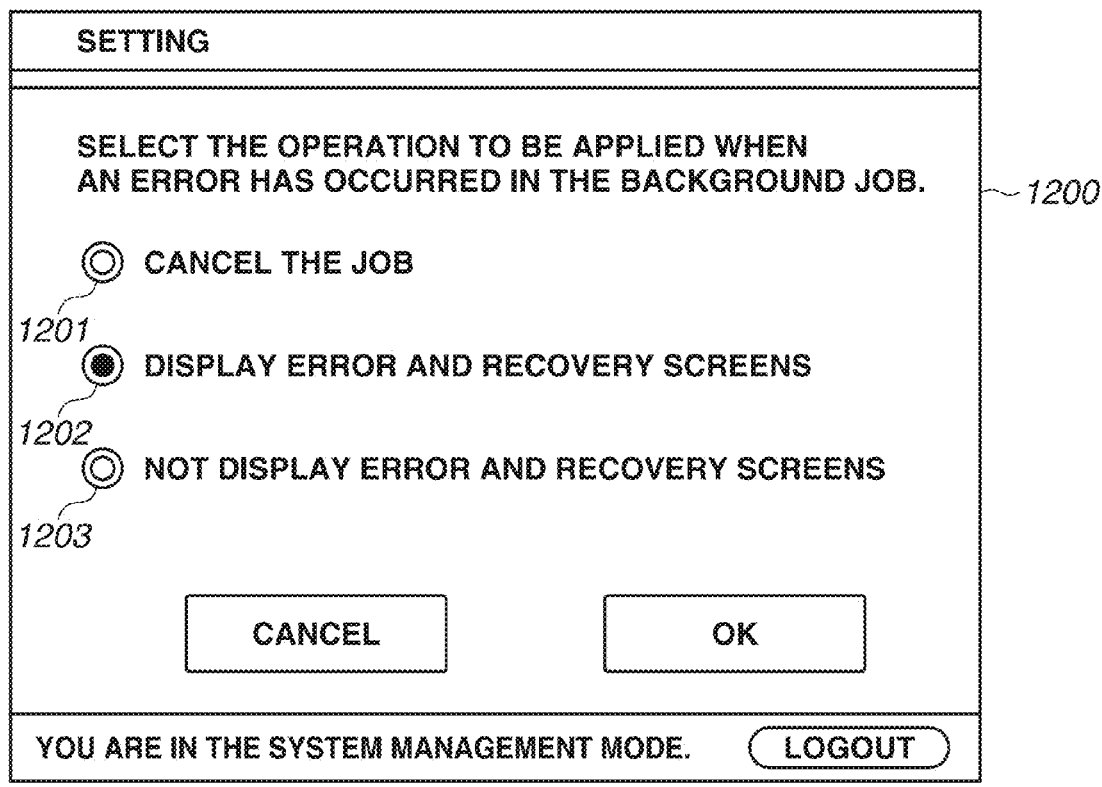
FIG. 12 illustrates a configuration of a screen according to a first exemplary embodiment.

A setting screen 1200 illustrated in FIG. 12 is displayed on the display 119 when the user presses a setting/registration button 405 on the main screen 400 (or the main screen 1000). The setting screen 1200 is a screen for receiving, from the user, a setting of processing that should be performed with respect to the interrupted job of the user A when the job of the user A running in the background is interrupted due to the interrupt factor while the user B is logging in to the MFP 103.

If a radio button 1201 is selected, the interrupted job of the user A is canceled according to the interruption of the job of the user A running in the background due to the interrupt factor while the user B is logging in to the MFP 103. In other words, the selection of the radio button 1201 allows the interrupted background job to be canceled, and therefore can reduce a downtime of the function unusable by the other user logging in as the interrupt login.

If a radio button 1202 is selected, the MFP 103 operates in the following manner. The error screen 800 illustrated in FIG. 8A, 8B, 8C, or 8D and the recovery screen 900 illustrated in FIG. 9A, 9B, 9C, or 9D for the interrupted job of the user A are displayed according to the interrupt of the job of the user A running in the background due to the interrupt factor while the user B is logging in.

The error screen 800 displayed on the display 119 is any one of the error screens 800 illustrated in FIGS. 8A to 8D according to the type of the interrupt factor that has impacted. Further, the recovery screen 900 displayed on the display 119 is any one of the recovery screens 900 illustrated in FIGS. 9A to 9D according to the type of the interrupt factor that has impacted. The same applies to the following description.

In other words, the job which the interrupt factor has impacted is resumed via the operation performed by the user B through the displays of the error screen 800 illustrated in FIG. 8A, 8B, 8C, or 8D and the recovery screen 900 illustrated in FIG. 9A, 9B, 9C, or 9D for the interrupted job of the user A. Therefore, this selection speeds up completion of the execution of the job instructed by the user A. In this manner, the selection of the radio button 1202 allows the operation for recovering the background job interrupted by the user other than the owner of the job running in the background.

If a radio button 1203 is selected, the MFP 103 operates in the following manner. The MFP 103 determines whether to display the error screen 800 illustrated in FIG. 8A, 8B, 8C, or 8D and the recovery screen 900 illustrated in FIG. 9A, 9B, 9C, or 9D for the interrupted job of the user A while the user B is logging in, depending on the interrupt factor that has impacted the job of the user A running in the background.

In other words, the MFP 103 can determine whether to allow the different user from the previous user who has logged in to the MFP 103, to perform the operation for resolving the interrupt factor that has impacted the job not instructed by the different user, in consideration of the type of the interrupt factor that has impacted the job instructed by the previous user.

In a case where the job of the user A running in the background is the scan job using the automatic document feeding unit 450, when the scan job is recovered after the jam of the original document 32 has occurred, the original documents 32 may be arranged in the incorrect order if the user B sets the original documents 32 on the document tray 30. Therefore, if the job of the user A running in the background is the scan job using the automatic document feeding unit 450, it is desirable that the user B does not set the original documents 32 on the document tray 30 when the scan job is recovered after the jam of the original document 32 has occurred.

On the other hand, if the job of the user A running in the background is the print job, it is desirable that the user B logging in to the MFP 103 resolves the jam of the sheet 301 for use in the printing when the print job is recovered after the jam of the sheet 301 for use in the printing has occurred. This is because both the user A and the user B can correctly perform the operation of resolving the jam of the sheet 301 for use in the printing. Then, the interrupted printing for the background job is resumed after the jam of the sheet 301 for use in the printing is resolved via the operation performed by the user B, which speeds up the completion of the execution of the job of the user A.

Further, if the job of the user A running in the background is the copy job that prints data onto the plain paper, when the run-out of the sheet 301 has occurred, it is less likely that the incorrect type of sheet is loaded as the sheet 301 as long as the sheet 301 is the plain paper even if the user B replenishes the sheet 301 into the cassette 351. Therefore, if the job of the user A running in the background is the copy job that prints the data onto the plain paper, it is desirable that the user A selects the radio button 1202 on the setting screen 1200 so that the user B can replenish the cassette 351 with the sheet 301 when the run-out of the sheet 301 has occurred.

On the other hand, if the job of the user A running in the background is the copy job that prints the data onto the preprint paper, when the run-out of the sheet 301 has occurred, it is likely that the incorrect type of sheet is loaded as the sheet 301 if the user B replenishes the manual feeding tray 350 with the sheet 301 because the sheet 301 is the preprint paper. Therefore, if the job of the user A running in the background is the copy job that prints the data onto the preprint paper, it is desirable that the user B does not replenish the manual feeding tray 350 with the sheet 301 when the run-out of the sheet 301 has occurred. In this case, the user A may select the radio button 1203 on the setting screen 1202. Alternatively, the user A may select the radio button 1201 on the setting screen 1200 to reduce the downtime of the function (the printing) which is not usable by the user B logging in as the interrupt login.

Thus, the user A can select the radio button 1203 to determine whether to allow the user B to perform the operation for resolving the interrupt factor that has impacted the job not instructed by the user B in consideration of the type of the interrupt factor that has impacted the job instructed by the user A.

On the other hand, the user A may select the radio button 1201 on the setting screen 1200 to reduce the downtime of the function (the scanning) which is not usable by the user B logging in as the interrupt login.

Thus, the setting information about a selected operation mode from among the radio button 1201, the radio button 1202, and the radio button 1203 is stored in the RAM 112 or the storage device 120.

A series of processes in which the user logs in to the MFP 103, and the job of the logging-in user is carried out on the MFP 103 according to the first exemplary embodiment will be described with reference to the flowcharts illustrated in FIGS. 13 and 14. The CPU 111 executes the control programs read out from the ROM 113 or the storage device 120 and developed on the RAM 112.

In step S1301, the CPU 111 determines whether the key for calling up the authentication screen (the authentication key) is pressed. If the CPU 111 determines that the authentication key is pressed (YES in step S1301), in step S1302, the CPU 111 displays the authentication screen on the display 119. On the other hand, if the CPU 111 determines that the authentication key is not pressed (NO in step S1301), the process of step S1301 is repeated until the authentication key is pressed.

Subsequently, in step S1303, the CPU 111 receives inputs of the authentication ID and the password via the authentication screen.

Subsequently, in step S1304, the CPU 111 refers to the authentication table 600 stored in the storage device 120. Then, in step S1304, the CPU 111 compares a pair of the input authentication ID and password, and the pair of the authentication ID (601) and the password (602) registered in the authentication table 600.

Subsequently, in step S1305, the CPU 111 determines whether the authentication of the user has succeeded based on a result of the comparison made in step S1304. The CPU 111 determines that the authentication of the user has succeeded (YES in step S1305) if the pair of the input authentication ID and password matches the pair of the authentication ID (601) and the password (602) registered in the authentication table 600. On the other hand, the CPU 111 determines that the authentication has not succeeded (NO in step S1305) if the pair of the input authentication ID and password does not match the pair of the authentication ID (601) and the password (602) registered in the authentication table 600.

If the CPU 111 determines that the authentication has not succeeded (NO in step S1305), in step S1319, the CPU 111 notifies the user that the authentication has failed. In this case, the failed user is not permitted to use the MFP 103. The CPU 111 may notify the user that the authentication has failed, by displaying a message on the display 119. Alternatively, the CPU 111 may notify the user that the authentication has failed with use of a sound and/or light. After the process of step S1319 is performed, the series of processes illustrated in FIG. 13 is ended.

On the other hand, if the CPU 111 determines that the authentication has succeeded (YES in step S1305), in step S1306, the CPU 111 changes a status of the user successfully authenticated in step S1305 from a "logout state" to a "login state".

Subsequently, in step S1307, the CPU 111 refers to the job management table 1100 stored in the storage device 120.

Then, in step S1308, the CPU 111 determines whether there is a background job based on a result of referring to the job management table 1100. The CPU 111 determines that there is a background job (YES in step S1308) if there is a job with the value of the background flag 1101 set to "TRUE" among the job(s) registered in the job management table 1100. On the other hand, the CPU 111 determines that there is no background job (NO in step S1308) if there is no job with the value of the background flag 1101 set to "TRUE" among the job(s) registered in the job management table 1100.

If the CPU 111 determines that there is a background job (YES in step S1308), the processing proceeds to step S1309. On the other hand, if the CPU 111 determines that there is no background job (NO in step S1308), the processing proceeds to step S1315.

First, the processes of steps S1309 to S1314, S1320, and S1321 will be described.

In step S1309, the CPU 111 determines whether an error (an interrupt factor) has occurred in the background job based on the result of referring to the job management table 1100. The CPU 111 determines that an error (an interrupt factor) has occurred in the background job (YES in step S1309) if there is a job with the value of the error flag 1104 set to "TRUE" among the jobs showing the value of the background flag 1101 set to "TRUE". On the other hand, the CPU 111 determines that no error (no interrupt factor) has occurred in the background job (NO in step S1309) if there is no job with the value of the error flag 1104 set to "TRUE" among the jobs showing the value of the background flag 1101 set to "TRUE".

If the CPU 111 determines that an error (an interrupt factor) has occurred in the background job (YES in step S1309), the processing proceeds to step S1310. On the other hand, if the CPU 111 determines that no error (no interrupt factor) has occurred in the background job (NO in step S1309), the processing proceeds to step S1314.

Subsequently, in step S1310, the CPU 111 determines whether an owner of the background job and the user successfully authenticated in step S1305 are the same person based on the result of referring to the job management table 1100. The CPU 111 determines that the owner of the background job and the user successfully authenticated in step S1305 are the same person (YES in step S1310) if the authentication ID (601) input on the authentication screen matches the job owner (the authentication ID) 1103 of the background job. On the other hand, the CPU 111 determines that the owner of the background job and the user successfully authenticated in step S1305 are not the same person (NO in step S1310) if the authentication ID (601) input on the authentication screen does not match the job owner (the authentication ID) 1103 of the background job.

If the CPU 111 determines that the owner of the background job and the user successfully authenticated in step S1305 are the same person (YES in step S1310), the processing proceeds to step S1410, which will be described below with reference to FIG. 14. On the other hand, if the CPU 111 determines that the owner of the background job and the user successfully authenticated in step S1305 are not the same person (NO in step S1310), the processing proceeds to step S1311.

In step S1311, the CPU 111 determines the operation mode (the control of the screen display for the recovery) to be applied when the error has occurred in the background job based on the information set via the setting screen 1200 illustrated in FIG. 12 and stored in the RAM 112 or the storage device 120.

Subsequently, if the CPU 111 determines that the operation mode is "CANCEL JOB (1201)" (CANCEL JOB (1201) in step S1311), in step S1312, the CPU 111 cancels the background job in which the error has occurred. Then, the processing proceeds to step S1314.

On the other hand, if the CPU 111 determines that the operation mode is "DISPLAY ERROR AND RECOVERY SCREENS (1202)" (DISPLAY ERROR AND RECOVERY SCREENS (1202) in step S1311), the processing proceeds to step S1410, which will be described below with reference to FIG. 14. On the other hand, if the CPU 111 determines that the operation mode is "NOT DISPLAY ERROR AND RECOVERY SCREENS (1203)" (NOT DISPLAY ERROR AND RECOVERY SCREENS (1203) in step S1311), the processing proceeds to step S1320.

In step S1320, the CPU 111 determines whether the error (the interrupt factor) has occurred in the background job due to the jam of the original document 32 being conveyed by the automatic document feeding unit 450. When the jam occurs with respect to the original document 32 being conveyed by the automatic document feeding unit 450, the result of the executing the job after the recovery may be different from the one intended by the owner of the job if the user other than the owner of the job recovers the jam. Therefore, if the interrupt factor has impacted the background job due to the jam of the original document 32, the screen display is controlled so as not to display the error screen 800 illustrated in FIG. 8A and the recovery screen 900 illustrated in FIG. 9A on the display 119 when the user other than the owner of the job is logging in.

If the CPU 111 determines that the error (the interrupt factor) has occurred due to the jam of the original document 32 being conveyed by the automatic document feeding unit 450 (YES in step S1320), the processing proceeds to step S1313. On the other hand, if the CPU 111 determines that the error (the interrupt factor) has not occurred due to the jam of the original document 32 being conveyed by the automatic document feeding unit 450 (NO in step S1320), the processing proceeds to step S1321.

Subsequently, in step S1321, the CPU 111 determines whether a specific error (a specific interrupt factor) has occurred in the background job due to the specific interrupt factor. The specific interrupt factor is defined to be such an interrupt factor that the result of the executing the job after the recovery can be different from the one intended by the owner of the job if the user other than the owner of the job recovers the interrupt factor.

The specific interrupt factor is, for example, the run-out of the remaining sheet 301 held in the manual feeding tray 350. If the specific interrupt factor is the run-out of the remaining sheet 301 held in the manual feeding tray 350, the screen display is controlled so as not display the error screen 800 illustrated in FIG. 8B and the recovery screen 900 illustrated in FIG. 9B on the display 119. This is because it is highly likely that the preprint paper or the special paper is held in the manual feeding tray 350, and it is highly likely that the incorrect sheet such as the plain paper, is inadvertently replenished if the user other than the owner of the job replenishes the manual feeding tray 350 with the sheet.

In a modification of the present exemplary embodiment, the MFP 103 may receive the type of the specific interrupt factor from the user via a setting screen displayed on the display 119 if it is determined YES in step S1321. In this modification, the MFP 103 can be configured to allow the user, for example, to set the run-out of the remaining toner for use in the printing and the run-out of the remaining sheet 301 stored in the cassette 351, as the specific interrupt factor as determined YES in step S1321.

If the CPU 111 determines that the error has occurred due to the specific interrupt factor (YES in step S1321), the processing proceeds to step S1313. On the other hand, if the CPU 111 determines that the error has not occurred due to the specific interrupt factor (NO in step S1321), the processing proceeds to step S1410, which will be described below with reference to FIG. 14.

Subsequently, in step S1313, the CPU 111 stores the identifier (the authentication ID) 1103 of the owner of the background job in which the error has occurred, in the RAM 112 or the storage device 120. The CPU 111 stores this information to allow the error screen 800 illustrated in FIG. 8A, 8B, 8C, or 8D and the recovery screen 900 illustrated in FIG. 9A, 9B, 9C, or 9D, to be displayed on the display 119 when the owner of the background job in which the error has occurred logs in to the MFP 103. After the process of step S1313, the processing proceeds to step S1314.

Subsequently, in step S1314, the CPU 111 limits the functions usable on the main screen 400 described with reference to FIG. 4. For example, if the function of the background job is the scanning, the screen display is controlled so as to prohibit the function using the scanning from being selected, like the main screen 1000 as illustrated with reference to FIG. 10 (1001 to 1004).

Subsequently, the processes of steps S1315 to S1318 will be described.

In step S1315, the CPU 111 displays the main screen (or the main screen 1000) on the display 119.

Subsequently, in step S1316, the CPU 111 determines whether a function is called up via the main screen 400 (or the main screen 1000). If the CPU 111 determines that a function is called up (YES in step S1316), the processing proceeds to step S1401, which will be described below with reference to FIG. 14. On the other hand, if the CPU 111 determines that no function is called up (NO in step S1316), in step S1317, the CPU 111 determines whether the logout key is pressed. If the CPU 111 determines that the logout key is pressed (YES in step S1317), the processing proceeds to step S1318. On the other hand, if the CPU 111 determines that the logout key is not pressed (NO in step S1317), the processing returns to step S1316.

Subsequently, in step S1318, the CPU 111 changes the status of the successfully authenticated user from the "login state" to the "logout state". Then, the processing proceeds to step S1410 in FIG. 14.

Subsequently, the flowchart illustrated in FIG. 14 will be described now.

Figures 13, 13A, 13B:
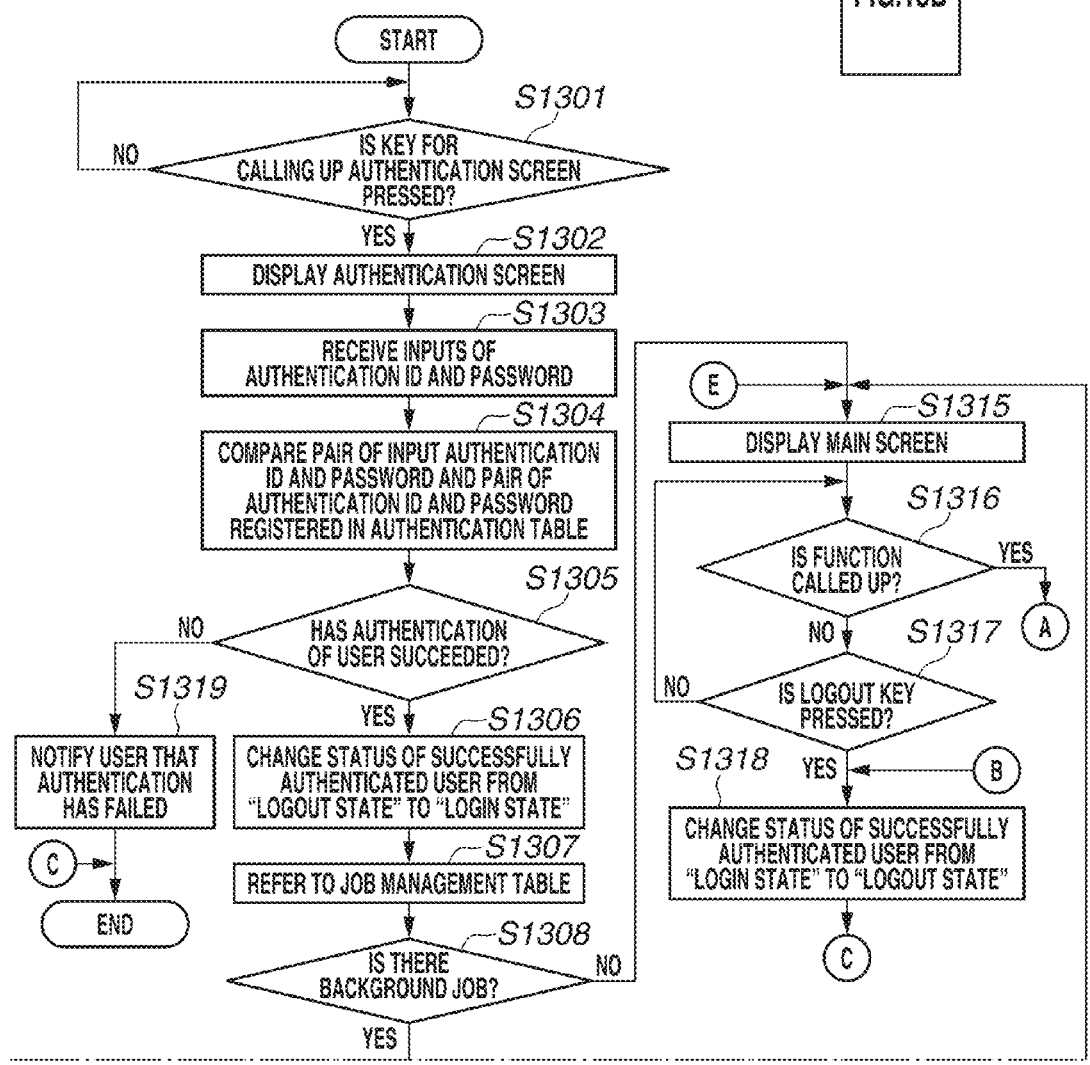
FIG. 13, including
FIG. 13A and FIG. 13B, is a flowchart illustrating an example of control according to the first exemplary embodiment.
Figure 13B:
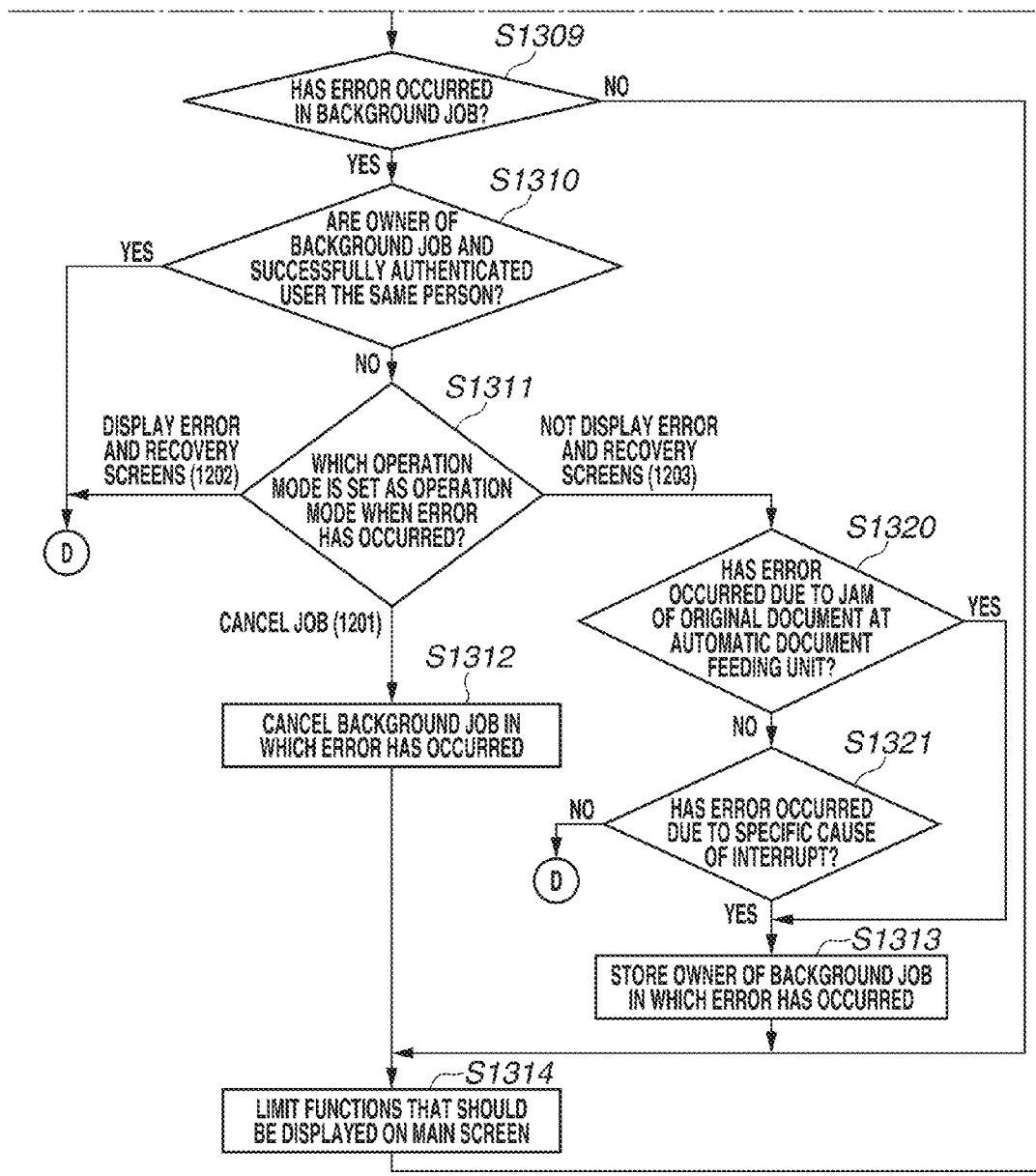
Figure 14:
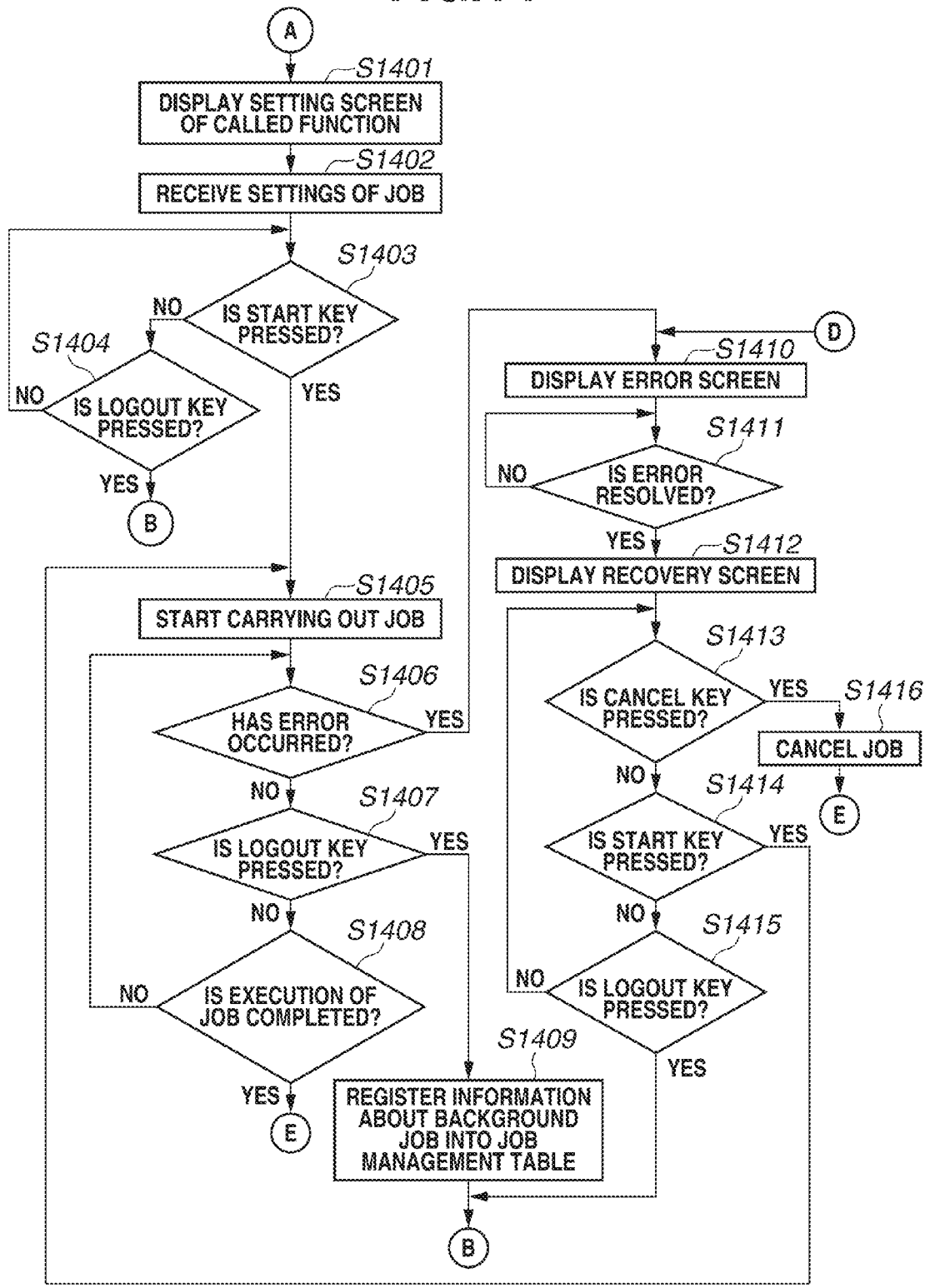
FIG. 14 is a flowchart illustrating the example of the control according to the first exemplary embodiment.

In step S1401, the CPU 111 displays the setting screen of the function called up in step S1316 in FIG. 13 on the display 119. For example, if the function called up in step S1316 in FIG. 13 is the scan transmission (403), the execution screen 500 described with reference to FIG. 5 is displayed on the display 119.

Subsequently, in step S1402, the CPU 111 receives settings of the job using the function called up in step S1316 in FIG. 13 from the user via the operation unit 130. For example, if the function called up in step S1316 in FIG. 13 is the scan transmission (403), the CPU 111 receives a selection of a color mode, a resolution specification, a setting of a document size, and the like from the user via the operation unit 130.

Subsequently, in step S1403, the CPU 111 determines whether the start key is pressed. If the CPU 111 determines that the start key is pressed (YES in step S1403), the processing proceeds to step S1405. On the other hand, if the CPU 111 determines that the start key is not pressed (NO in step S1403), in step S1404, the CPU 111 determines whether the logout key is pressed. If the CPU 111 determines that the logout key is pressed (YES in step S1404), the processing proceeds to step S1318 described above with reference to FIG. 13. On the other hand, if the CPU 111 determines that the logout key is not pressed (NO in step S1404), the processing returns to step S1403.

Subsequently, in step S1405, the CPU 111 starts carrying out the job using the function called up in step S1316 illustrated in FIG. 13. For example, if the function called up in step S1316 illustrated in FIG. 13 is the scan transmission (403), the CPU 111 instructs the automatic document feeding unit 450 to start conveying the original document(s) 32 set on the document tray 30.

Subsequently, in step S1406, the CPU 111 determines whether an error has occurred while the job is running. For example, the CPU 111 determines that an error has occurred while the job is running (YES in step S1406) if the jam of the original document 32 has occurred while the scan job is running or if the run-out of the sheet 301 has occurred while the copy job is running. If the CPU 111 determines that an error has occurred while the job is running (YES in step S1406), the processing proceeds to step S1410. On the other hand, if the CPU 111 determines that no error has occurred while the job is running (NO in step S1406), the processing proceeds to step S1407.

First, the processes of steps S1407 to S1409 will be described.

In step S1407, the CPU 111 determines whether the logout key is pressed. If the CPU 111 determines that the logout key is pressed (YES in step S1407), the processing proceeds to step S1409. On the other hand, if the CPU 111 determines that the logout key is not pressed (NO in step S1407), in step S1408, the CPU 111 determines whether the execution of the job is completed. If the CPU 111 determines that the execution of the job is completed (YES in step S1408), the processing proceeds to step S1315 described with reference to FIG. 13. On the other hand, if the CPU 111 determines that the execution of the job is not completed (NO in step S1408), the processing returns to step S1406.

Subsequently, in step S1409, the CPU 111 registers the information about the background job in the job management table 1100. More specifically, the CPU 111 registers each value of the background flag 1101, the job identifier 1102, the job owner (the authentication ID) 1103, and the error flag 1104 as the information regarding the job that has started being carried out in step S1405, as described with reference to FIG. 11. This registration allows the MFP 103 to manage the job which is running in the background even after the owner of this job is brought into the logout state because the logout key is pressed while the job is running, by using the job management table 1100.

Subsequently, the processes after step S1410 will be described.

In step S1410, the CPU 111 displays the error screen 800 described with reference to FIG. 8A, 8B, 8C, or 8D on the display 119. The message 801 on the error screen 800 allows the user operating the MFP 103 to confirm that the error (the interrupt factor) has occurred in the running job. Further, the message 802 on the error screen 800 allows the user operating the MFP 103 to confirm a method for dealing with the error to resolve the error (the interrupt factor) that has occurred in the running job.

Subsequently, in step S1411, the CPU 111 determines whether the error (the interrupt factor) has been resolved. For example, if the error has occurred due to the jam of the original document 32 while the scan job is running, the CPU 111 determines that the error (the interrupt factor) has been resolved based on the removal of the jammed original document 32 from the automatic document feeding unit 450 by the user.

If the CPU 111 determines that the error (the interrupt factor) has been resolved (YES in step S1411), the processing proceeds to step S1412. On the other hand, if the CPU 111 determines that the error (the interrupt factor) has not been resolved (NO in step S1411), the process of step S1411 is repeated until the error (the interrupt factor) is resolved.

Subsequently, in step S1412, the CPU 111 displays the recovery screen 900 described with reference to FIG. 9A, 9B, 9C, or 9D on the display 119. The message 902 on the recovery screen 900 allows the user operating the MFP 103 to confirm a method for dealing with the interrupt to recover the job interrupted due to the error (the interrupt factor).

Subsequently, in step S1413, the CPU 111 determines whether the cancel key 901 is pressed on the recovery screen 900. If the CPU 111 determines that the cancel key 901 is pressed (YES in step S1413), in step S1416, the job is canceled. After the process of step S1416, the processing proceeds to step S1315.

On the other hand, if the CPU 111 determines that the cancel key 901 is not pressed (NO in step S1413), in step S1414, the CPU 111 determines whether the start key is pressed.

If the CPU 111 determines that the start key is pressed (YES in step S1414), the processing returns to step S1405. In other words, in step S1405, the execution of the job interrupted due to the interrupt factor is resumed upon the pressing of the start key.

On the other hand, if the CPU 111 determines that the start key is not pressed (NO in step S1414), in step S1415, the CPU 111 determines whether the logout key is pressed. If the CPU 111 determines that the logout key is pressed (YES in step S1415), the processing proceeds to step S1318 described above with reference to FIG. 13. On the other hand, if the CPU 111 determines that the logout key is not pressed (NO in step S1415), the processing returns to step S1413.

The details of the series of processes have been described above in which the user logs in to the MFP 103 and the job of the logging-in user is carried out on the MFP 103 according to the first exemplary embodiment.

In the first exemplary embodiment, the CPU 111 controls the operation for recovering the job of the user A running in the background when the job of the user A running in the background is interrupted due to the interrupt factor while the user B is logging in to the MFP 103.

For example, the CPU 111 performs control so as to cancel the job of the user A when the job of the user A running in the background is interrupted while the user B is logging in to the MFP 103 (a first operation mode: 1201). This control allows the MFP 103 to terminate the occupation of the hardware used by the job (the function) of the user A that has been running in the background and interrupted due to the interrupt factor. Therefore, the MFP 103 can reduce the downtime that occurs due to the unavailability of the relevant function for the user B.

Further, the CPU 111 performs control so as to display the error screen 800 and the recovery screen 900 on the display 119 when the job of the user A running in the background is interrupted while the user B is logging in to the MFP 103 (a second operation mode: 1202). Thus, the MFP 103 can resume the execution of the interrupted background job through the displays of the error screen 800 and the recovery screen 900, thereby speeding up the completion of the execution of the background job. In this manner, the MFP 103 allows a user other than the owner of the job running in the background to perform the operation for recovering the interrupted background job.

Further, the CPU 111 determines whether to display the error screen 800 and the recovery screen 900 while the user B is logging in, based on the interrupt factor of the job of the user A when the job of the user A running in the background is interrupted (a third operation mode: 1203). Thus, the MFP 103 can determine whether to allow the user different from the previous user who has logged in to the MFP 103, to perform the operation for resolving the interrupt factor that has impacted the job not instructed by the different user, in consideration of the type of the interrupt factor of the job instructed by the previous user. The present exemplary embodiment has been described assuming that one operation mode in which the MFP 103 should operate is set among the above-described first operation mode, second operation mode, and third operation mode which the user arbitrarily selects via the setting screen 1200 described with reference to FIG. 12, but is not limited thereto. In a further modification of the present exemplary embodiment, the operation mode in which the MFP 103 should operate may be set to a single operation mode by default from among the above-described first operation mode, second operation mode, and third operation mode according to the type of the job (the function) running in the background. For example, if the job running in the background is the function using the scanning, the third operation mode may be set by default as the operation mode in which the MFP 103 should operate. This is because the resumed job should be prevented from being executed with the result unintended by the owner of this job if the original document 32 is set on the document tray 32 being arranged in the incorrect order by the user other than the owner of the job.

In the following description, a second exemplary embodiment will be described. According to the first exemplary embodiment, the MFP 103 allows a user other than the owner of the job running in the background to perform the operation for recovering the interrupted background job when the above-described second operation mode is set.

The second exemplary embodiment will be described as configured in the following manner. The MFP 103 displays the screen prompting a user other than the owner of the job running in the background to perform the operation for resolving the error in the interrupted background job. On the other hand, the MFP 103 does not display the screen prompting the other user to perform the operation for resuming the interrupted background job. In other words, in the second exemplary embodiment, when the above-described second operation mode is set, the CPU 111 performs control to allow the user to recover the interrupted background job as long as the owner of the interrupted background job is logging in.

The MFP 103 according to the second exemplary embodiment performs similar processes illustrated in the flowchart described with reference to FIG. 13, except that only a part thereof is different from FIG. 13. Therefore, the MFP 103 according to the second exemplary embodiment will be described focusing on the different processes from the first exemplary embodiment with reference to FIGS. 15 and 16. Processes in common with the first exemplary embodiment (FIGS. 13 and 14) will be identified by the same step numbers, and will not be described in detail below.

Figure 15:
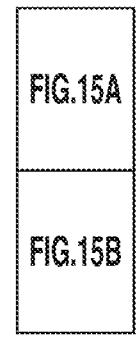
FIG. 15, including
Figure 15A:
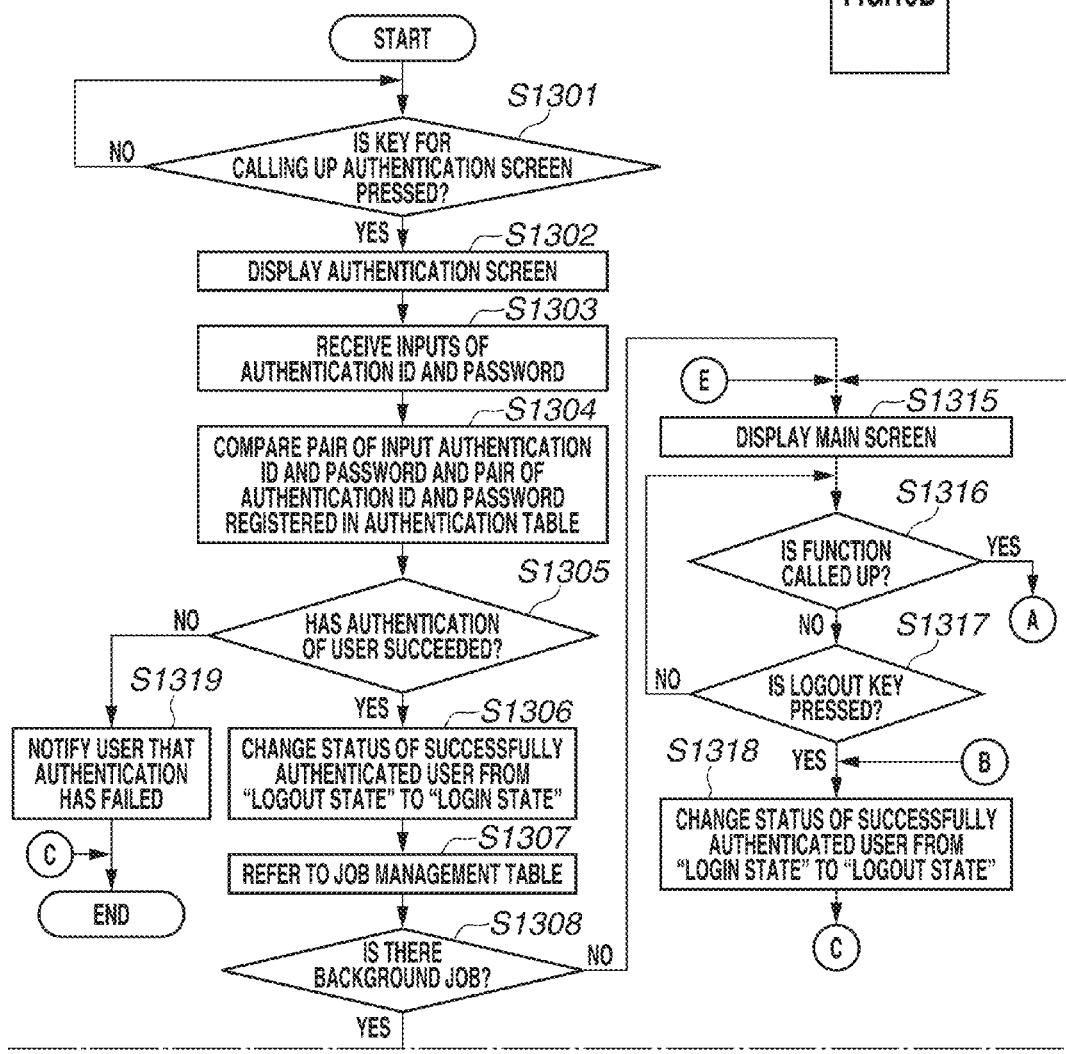
FIG. 15A and FIG. 15B, is a flowchart illustrating an example of control according to a second exemplary embodiment.
Figure 15B:
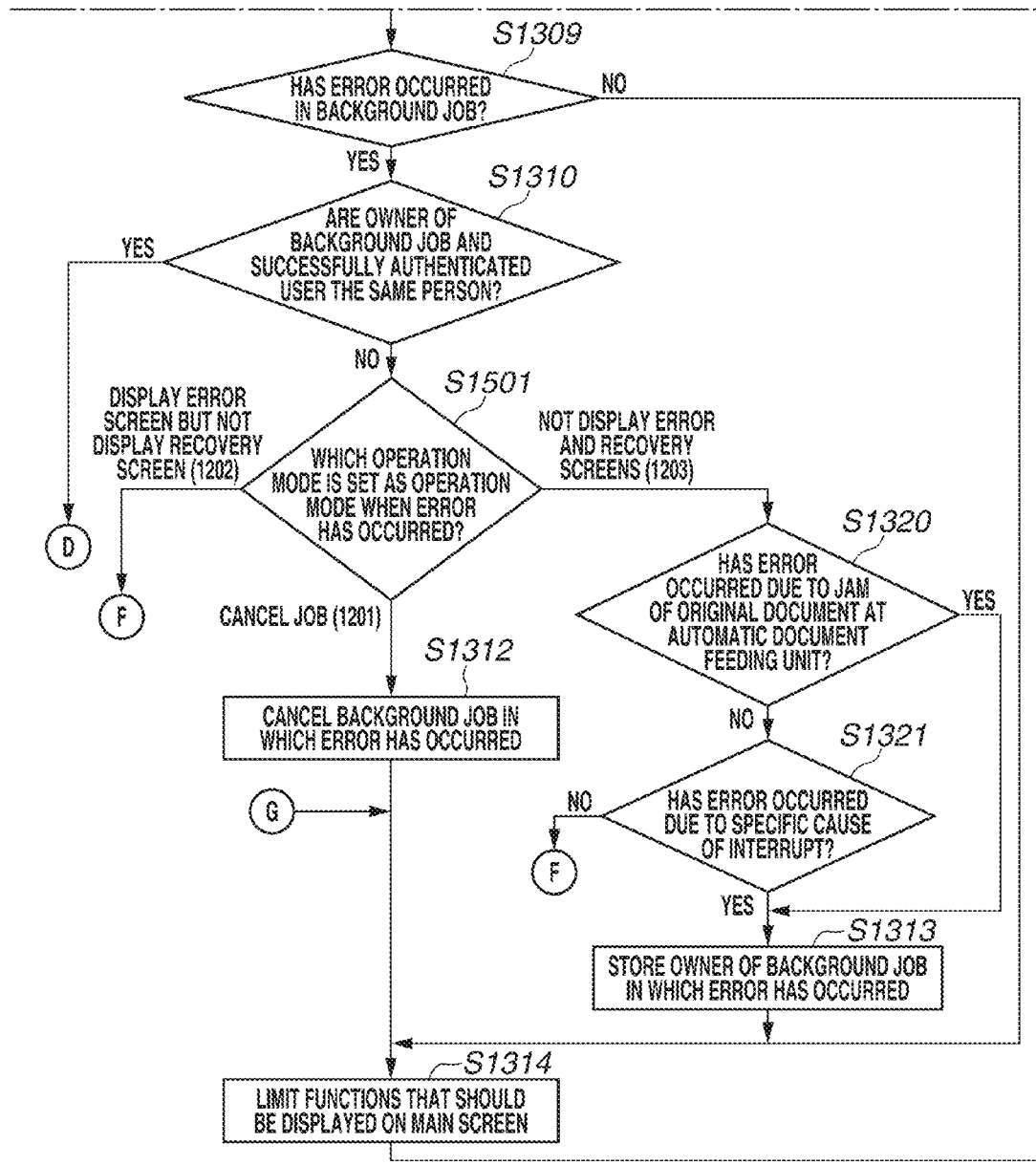

If the CPU 111 determines that the owner of the background job and the user successfully authenticated in step S1305 are not the same person (NO in step S1310), the processing proceeds to step S1501 illustrated in FIG. 15.

In step S1501, the CPU 111 determines the operation mode (control of the screen display for the recovery) to be applied when the error has occurred in the background job based on the information set via the setting screen 1200 illustrated in FIG. 12 and stored in the RAM 112 or the storage device 120.

If the CPU 111 determines that the operation mode is "CANCEL JOB (1201)" (i.e., the first operation mode) (CANCEL JOB (1201) in step S1501), the processing proceeds to step S1312 illustrated in FIG. 15. On the other hand, if the CPU 111 determines that the operation mode is "NOT DISPLAY ERROR AND RECOVERY SCREENS (1203)" (i.e., the third operation mode) (NOT DISPLAY ERROR AND RECOVERY SCREENS (1203) in step S1501), the processing proceeds to step S1320 illustrated in FIG. 15.

Figure 16:
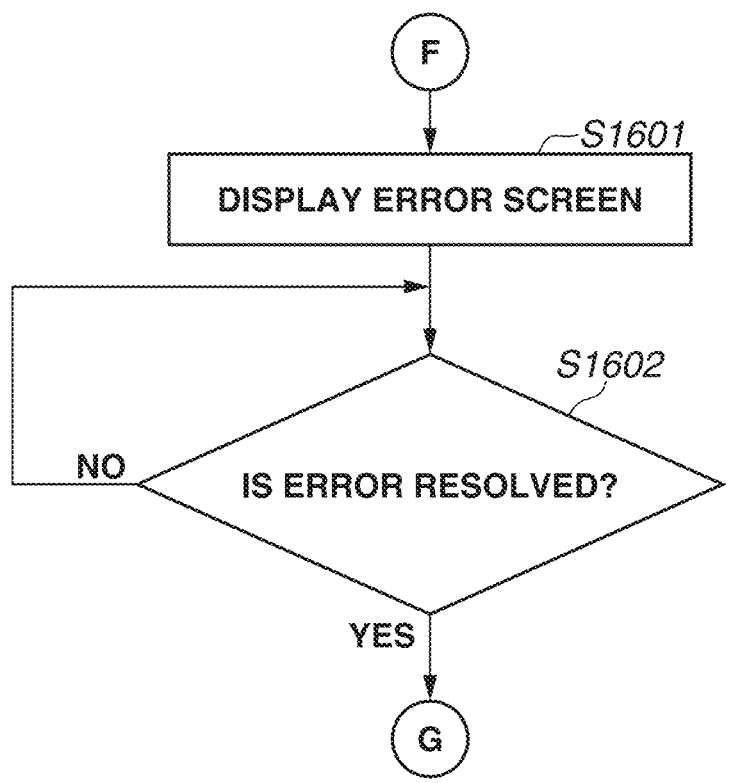
FIG. 16 is a flowchart illustrating the example of the control according to the second exemplary embodiment.

In the second exemplary embodiment, if the CPU 111 determines that the error has not occurred due to the specific interrupt factor (NO in step S1321), the processing proceeds to step S1601 illustrated in FIG. 16, unlike the first exemplary embodiment.

Further, in the second exemplary embodiment, "DISPLAY ERROR SCREEN BUT NOT DISPLAY RECOVERY SCREEN" is displayed at the radio button 1202 on the setting screen 1200 illustrated in FIG. 12, unlike the first exemplary embodiment.

Further, in the second exemplary embodiment, if the CPU 111 determines that the operation mode is "DISPLAY ERROR SCREEN BUT NOT DISPLAY RECOVERY SCREEN (1202)" (i.e., the second operation mode) (DISPLAY ERROR SCREEN BUT NOT DISPLAY RECOV- ERY SCREEN in step S1501), the processing proceeds to step S1601 illustrated in FIG. 16, unlike the first exemplary embodiment.

Subsequently, the flowchart illustrated in FIG. 16 will be described now.

In step S1601, the CPU 111 displays the error screen 800 described with reference to FIG. 8A, 8B, 8C, or 8D on the display 119. The message 801 on the error screen 800 allows the user operating the MFP 103 to confirm that the error has occurred in the running job. Further, the message 802 on the error screen 800 allows the user operating the MFP 103 to confirm a coping method for resolving the error that has occurred in the running job.

Subsequently, in step S1602, the CPU 111 determines whether the error (the interrupt factor) that has occurred in the background job is resolved. For example, if the error (the interrupt factor) has occurred due to the jam of the original document 32 while the scan job is running, the CPU 111 determines that the error (the interrupt factor) is resolved based on the removal of the jammed original document 32 from the automatic document feeding unit 450 by the user.

If the CPU 111 determines that the error (the interrupt factor) is resolved (YES in step S1602), the processing proceeds to step S1314 illustrated in FIG. 15. On the other hand, if the CPU 111 determines that the error (the interrupt factor) is not resolved (NO in step S1602), the process of step S1602 is repeated until the error (the interrupt factor) is resolved.

The above is the details of the process performed by the MFP 103 according to the second exemplary embodiment that is different from the first exemplary embodiment in the processes illustrated in the flowchart described with reference to FIG. 13.

In the above-described manner, in the second exemplary embodiment, the CPU can perform control in the following manner. The MFP 103 displays the screen prompting the user other than the owner of the job running in the background to perform the operation for resolving the interrupt factor of the interrupted background job. On the other hand, the MFP 103 can perform control not to display the screen prompting the other user to perform the operation for resuming the interrupted background job.

When the interrupt factor of the interrupted background job is resolved by the other user than the owner of the job running in the background, the owner of the background job should resume the interrupted background job. Therefore, as a modification of the present exemplary embodiment, the MFP 103 may display a recovery screen 1700 illustrated in FIG. 17A, 17B, 17C, or 17D instead of the recovery screen 900 described with reference to FIG. 9A, 9B, 9C, or 9D when the owner of the background job which the interrupt factor has impacted, logs in to the MFP 103.

The recovery screens 1700 illustrated in FIGS. 17A to 17D are different from the recovery screens 900 illustrated in FIGS. 9A to 9D in that messages 1701 are displayed on the recovery screens 1700 to attract the attention of the owner of the background job in which the error (the interrupt factor) has occurred.

For example, the message 1701 illustrated in FIG. 17A prompts the owner of the background job in which the error has occurred to confirm whether the original documents 32 set on the document tray 30 by the other user are arranged in the correct order before resuming the background job. This prompt can prevent the background job in which the error has occurred from being executed with the result unintended by the owner of the background job.

For example, the message 1701 illustrated in FIG. 17B prompts the owner of the background job in which the error has occurred to confirm whether the sheet 301 set on the manual feeding tray 350 by another user is the correct sheet before resuming the background job. This prompt can prevent the background job in which the error has occurred from being executed with the result unintended by the owner of the background job in which the error has occurred.

Other Exemplary Embodiments

The present invention is not limited to the above-described exemplary embodiments. These exemplary embodiments can be modified in various manners (including organic combinations of the individual exemplary embodiments) based on the spirit of the present invention, and such modifications are not excluded from the scope of the present invention.

For example, in the present exemplary embodiments, the CPU 111 of the controller unit 100 of the MFP 103 exclusively performs the above-described various kinds of control, but the present invention is not limited thereto. A part or all of the above-described various kinds of control may be carried out by a print control apparatus such as an externally mounted controller housed in an individual housing separate from the MFP 103.

The present invention can also be realized by processing including supplying a program capable of realizing one or more function(s) of the above-described exemplary embodiments to a system or an apparatus via a network or a storage medium, and causing one or more processor(s) in a computer of this system or apparatus to read out and execute the program. Further, the present invention can also be realized by a circuit (for example, an application specific integrated circuit (ASIC)) capable of realizing one or more function(s).

According to the present invention, the job processing apparatus can, based on the interrupt factor that has impacted the job instructed by the previous user who had logged in, determine whether to display the screen for resuming the job which the interrupt factor has impacted while the different user from the previous user is logging in.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-124268, filed Jun. 19, 2015, which is hereby incorporated by reference herein in its entirety.

What is claimed is:

1. A job processing apparatus comprising:
at least one processor;
an execution unit implemented by the at least one processor and configured to execute a job; and
a display configured to display, when a first interrupt factor is generated in the job being executed by the execution unit, a first screen regarding an operation for resuming the job which the first interrupt factor has impacted, and configured to display, when a second interrupt factor is generated in the job being executed by the execution unit, a second screen regarding an operation for resuming the job which the second interrupt factor has impacted,
wherein, based on the first interrupt factor that has impacted the job instructed by a previous user who has logged in to the job processing apparatus, the display displays the first screen while the previous user is logging in to the job processing apparatus,
wherein, based on the second interrupt factor that has impacted the job instructed by the previous user, the display displays the second screen while the previous user is logging in to the job processing apparatus,
wherein, based on the first interrupt factor that has impacted the job instructed by the previous user, the display displays the first screen while a different user from the previous user is logging in to the job processing apparatus, and
wherein, based on the second interrupt factor that has impacted the job instructed by the previous user, the display does not display the second screen while the different user from the previous user is logging in to the job processing apparatus.

2. The job processing apparatus according to claim 1, further comprising a first setting unit implemented by the at least one processor and configured to set the display so as to, based on an interrupt factor that has impacted the job instructed by the previous user, display a screen regarding an operation for resuming the job which the interrupt factor has impacted while the different user from the previous user is logging in to the job processing apparatus,
wherein, based on the second interrupt factor that has impacted the job instructed by the previous user and if the display is set so as to display the screen by the first setting unit, the display displays the second screen while the different user from the previous user is logging in to the job processing apparatus.

3. The job processing apparatus according to claim 1, wherein, if the display does not display the second screen while the different user from the previous user is logging in to the job processing apparatus, the display displays the second screen when the previous user logs in to the job processing apparatus.

4. The job processing apparatus according to claim 1, further comprising a determination unit implemented by the at least one processor and configured to determine whether the user, who has instructed the job which the interrupt factor has impacted, is logging in to the job processing apparatus,
wherein, based on the first interrupt factor that has impacted the job instructed by the previous user, the display displays the first screen while the previous user is logging in to the job processing apparatus,
wherein, based on the second interrupt factor that has impacted the job instructed by the previous user and if the determination unit determines that the user who has instructed the job which the interrupt factor has impacted is logging in to the job processing apparatus, the display displays the second screen while the previous user is logging in to the job processing apparatus,
wherein, based on the first interrupt factor that has impacted the job instructed by the previous user, the display displays the first screen while the different user from the previous user is logging in to the job processing apparatus, and
wherein, based on the second interrupt factor that has impacted the job instructed by the previous user and if the determination unit determines that the user who has instructed the job which the interrupt factor has impacted is not logging in to the job processing apparatus, the display does not display the second screen while the different user from the previous user is logging in to the job processing apparatus.

5. The job processing apparatus according to claim 1, wherein the second interrupt factor is a jam of an original document to be read by a scanner.

6. The job processing apparatus according to claim 1, wherein the first interrupt factor is a jam of a sheet on which an image is to be printed by a printer.

7. The job processing apparatus according to claim 1, further comprising:
a sheet conveyer configured to convey a sheet from a holding unit; and
a printer configured to print an image onto the sheet conveyed from the sheet conveyer,
wherein the second interrupt factor is that the sheet, on which the image is to be printed by the printer, is not held in the holding unit.

8. The job processing apparatus according to claim 7, wherein the holding unit is a manual feeding tray.

9. The job processing apparatus according to claim 1, wherein the first interrupt factor is run-out of remaining toner to be used in printing by a printer.

10. The job processing apparatus according to claim 1, wherein a type of the second interrupt factor can be set by a user.

11. A job processing apparatus comprising:
at least one processor;
an execution unit implemented by the at least one processor and configured to execute a job;
a display configured to display, when an interrupt factor is generated in the job being executed by the execution unit, a screen regarding an operation for resuming the job which the interrupt factor has impacted; and
a determination unit implemented by the at least one processor and configured to determine, based on a content of the interrupt factor that has impacted the job instructed by a previous user who has logged in to the job processing apparatus, whether to display the screen while a different user from the previous user is logging in to the job processing apparatus.

12. A job processing apparatus comprising:
at least one processor;
an execution unit implemented by the at least one processor and configured to execute a job;
a first display configured to display, after a first interrupt factor is generated in the job being executed by the execution unit, a first screen regarding an operation for resuming the job which the first interrupt factor has impacted; and
a second display configured to display, after a second interrupt factor is generated in the job being executed by the execution unit, a second screen regarding an operation for resuming the job which the second interrupt factor has impacted,
wherein the first display displays the first screen regardless whether a user logging in to the job processing apparatus is the same user as or a different user from a user who has instructed the job which the first interrupt factor has impacted, and
wherein the second display displays the second screen when the user logging in to the job processing apparatus is the same user as the user who has instructed the job which the second interrupt factor has impacted.

13. A method for controlling a job processing apparatus, the method comprising:
executing a job using at least one processor; and
displaying, on a display when a first interrupt factor is generated in the job being executed, a first screen regarding an operation for resuming the job which the first interrupt factor has impacted, and configured to display, when a second interrupt factor is generated in the job being executed, a second screen regarding an operation for resuming the job which the second interrupt factor has impacted,
wherein, based on the first interrupt factor that has impacted the job instructed by a previous user who has logged in to the job processing apparatus, the display displays the first screen while the previous user is logging in to the job processing apparatus,
wherein, based on the second interrupt factor that has impacted the job instructed by the previous user, the display displays the second screen while the previous user is logging in to the job processing apparatus,
wherein, based on the first interrupt factor that has impacted the job instructed by the previous user, the display displays the first screen while a different user from the previous user is logging in to the job processing apparatus, and
wherein, based on the second interrupt factor that has impacted the job instructed by the previous user, the display does not display the second screen while the different user from the previous user is logging in to the job processing apparatus.

14. A non-transitory computer-readable storage medium storing a program to cause a computer to perform a method for controlling a job processing apparatus, the method comprising:
executing a job using at least one processor; and
displaying, on a display when a first interrupt factor is generated in the job being executed, a first screen regarding an operation for resuming the job which the first interrupt factor has impacted, and configured to display, when a second interrupt factor is generated in the job being executed, a second screen regarding an operation for resuming the job which the second interrupt factor has impacted,
wherein, based on the first interrupt factor that has impacted the job instructed by a previous user who has logged in to the job processing apparatus, the display displays the first screen while the previous user is logging in to the job processing apparatus,
wherein, based on the second interrupt factor that has impacted the job instructed by the previous user, the display displays the second screen while the previous user is logging in to the job processing apparatus,
wherein, based on the first interrupt factor that has impacted the job instructed by the previous user, the display displays the first screen while a different user from the previous user is logging in to the job processing apparatus, and
wherein, based on the second interrupt factor that has impacted the job instructed by the previous user, the display does not display the second screen while the different user from the previous user is logging in to the job processing apparatus.

* * * * *